(12) United States Patent
Stokes et al.

(10) Patent No.: US 7,709,580 B2
(45) Date of Patent: May 4, 2010

(54) METHOD FOR PREPARATION OF POLYLEFINS CONTAINING EXO-OLEFIN CHAIN ENDS

(75) Inventors: Casey D. Stokes, Novato, CA (US); Kelby Simison, Marysville, CA (US); Robson F. Storey, Hattiesburg, MS (US); James J. Harrison, Novato, CA (US)

(73) Assignees: Chevron Oronite Company LLC, San Eamon, CA (US); The University of Sourthern Mississippi, Hattiesburg, MS (US)

( * ) Notice: Subject to any disclaimer, the term of this patent is extended or adjusted under 35 U.S.C. 154(b) by 952 days.

(21) Appl. No.: 11/207,366

(22) Filed: Aug. 19, 2005

(65) Prior Publication Data

US 2006/0041083 A1 Feb. 23, 2006

Related U.S. Application Data

(60) Provisional application No. 60/603,423, filed on Aug. 20, 2004.

(51) Int. Cl.
*C08F 8/32* (2006.01)

(52) U.S. Cl. .............. 525/375; 525/374; 525/333.7; 525/379

(58) Field of Classification Search ............ 525/375, 525/374, 333.7, 379
See application file for complete search history.

(56) References Cited

U.S. PATENT DOCUMENTS

| | | |
|---|---|---|
| 3,155,686 A | 11/1964 | Prill et al. |
| 3,632,600 A | 1/1972 | Morris et al. |
| 4,034,038 A | 7/1977 | Vogel |
| 4,152,499 A | 5/1979 | Boerzel et al. |
| 4,238,628 A | 12/1980 | Cahill et al. |
| 4,255,538 A | 3/1981 | Skillcorn |
| 4,276,394 A | 6/1981 | Kennedy et al. |
| 4,342,849 A | 8/1982 | Kennedy |
| 4,393,199 A | 7/1983 | Manser |
| 4,468,291 A | 8/1984 | Naarmann et al. |
| 4,486,572 A | 12/1984 | Kennedy |
| 4,568,732 A | 2/1986 | Kennedy et al. |
| 4,758,631 A | 7/1988 | Kennedy et al. |
| 4,814,405 A | 3/1989 | Kennedy |
| 4,910,321 A | 3/1990 | Kennedy et al. |
| 4,929,683 A | 5/1990 | Kennedy et al. |
| 4,943,616 A | 7/1990 | Mishra et al. |
| 4,946,899 A | 8/1990 | Kennedy et al. |
| 4,948,936 A | 8/1990 | Landry |
| 5,032,653 A | 7/1991 | Cheradame et al. |
| 5,066,730 A | 11/1991 | Kennedy et al. |
| 5,112,507 A | 5/1992 | Harrison |
| 5,122,572 A | 6/1992 | Kennedy et al. |
| 5,169,914 A | 12/1992 | Kaszas et al. |
| 5,175,225 A | 12/1992 | Ruhe, Jr. |
| 5,219,948 A | 6/1993 | Storey et al. |
| 5,225,492 A | 7/1993 | Kennedy et al. |
| 5,286,823 A | 2/1994 | Rath |
| 5,300,701 A | 4/1994 | Cherpeck |
| 5,334,321 A | 8/1994 | Harrison et al. |
| 5,336,745 A | 8/1994 | Cheradame et al. |
| 5,340,881 A | 8/1994 | Kennedy et al. |
| 5,350,786 A | 9/1994 | Costanzi et al. |
| 5,350,819 A | 9/1994 | Shaffer |
| 5,395,885 A | 3/1995 | Kennedy et al. |
| 5,428,111 A | 6/1995 | Faust et al. |
| 5,444,135 A | 8/1995 | Cheradame et al. |
| 5,448,000 A | 9/1995 | Gullapalli et al. |
| 5,451,647 A | 9/1995 | Faust et al. |
| 5,464,549 A | 11/1995 | Sieberth |
| 5,506,316 A | 4/1996 | Shaffer |
| 5,580,935 A | 12/1996 | Shaffer |
| 5,616,668 A | 4/1997 | Harrison et al. |
| 5,629,394 A | 5/1997 | Cheradame et al. |
| 5,637,647 A | 6/1997 | Faust |
| 5,663,457 A | 9/1997 | Kolp |
| 5,663,470 A | 9/1997 | Chen et al. |
| 5,677,386 A | 10/1997 | Faust |
| 5,690,861 A | 11/1997 | Faust |
| 5,777,044 A | 7/1998 | Faust |
| 5,945,491 A | 8/1999 | Matyjaszewski et al. |
| 5,948,936 A * | 9/1999 | Itoh et al. ............. 560/152 |
| 6,033,446 A | 3/2000 | Cherpeck et al. |
| 6,194,597 B1 | 2/2001 | Faust et al. |
| 6,407,066 B1 | 6/2002 | Dressen et al. |

(Continued)

FOREIGN PATENT DOCUMENTS

DE 237072 7/1986

(Continued)

OTHER PUBLICATIONS

Bae et al. "beta-Proton elimination by Free Bases in the Living carbocationic Polymerization of Isobutylene," Macromolecules, 30, 7341-7344 (1997).*

(Continued)

*Primary Examiner*—Ling-Siu Choi

(57) ABSTRACT

The present invention is directed to a method for preparation of polyolefins containing exo-olefin chain ends. The method involves quenching a cationic quasi-living polyolefin polymer system with a nitrogen-containing five-membered aromatic ring having at least two hydrocarbyl substituent compounds attached to the ring.

37 Claims, No Drawings

U.S. PATENT DOCUMENTS

| | | | |
|---|---|---|---|
| 6,451,920 B1 | 9/2002 | Harrison et al. | |
| 6,468,948 B1 | 10/2002 | Rossi et al. | |
| 6,515,083 B2 | 2/2003 | Ozawa et al. | |
| 6,642,318 B1 | 11/2003 | Chiefari et al. | |
| 6,753,391 B1 | 6/2004 | Lewandowski et al. | |
| 6,818,716 B2 | 11/2004 | Wendland et al. | |
| 6,906,011 B2 | 6/2005 | Harrison et al. | |
| 6,969,744 B2 * | 11/2005 | Stokes et al. | 525/375 |
| 7,071,275 B2 | 7/2006 | Rath et al. | |
| 7,124,110 B1 | 10/2006 | Kemp, II et al. | |
| 7,420,019 B2 | 9/2008 | Stokes | |
| 7,501,476 B2 | 3/2009 | Stokes | |
| 2002/0082367 A1 | 6/2002 | McConville et al. | |
| 2002/0132905 A1 | 9/2002 | Babinee et al. | |
| 2003/0105194 A1 | 6/2003 | Stuart et al. | |
| 2003/0162858 A1 | 8/2003 | Faust et al. | |
| 2003/0191257 A1 | 10/2003 | Wettling et al. | |
| 2004/0015029 A1 * | 1/2004 | Lange et al. | 585/521 |
| 2004/0260033 A1 | 12/2004 | Stokes et al. | |
| 2005/0282972 A1 | 12/2005 | Stokes et al. | |
| 2006/0041081 A1 | 2/2006 | Stokes et al. | |
| 2006/0041083 A1 | 2/2006 | Stokes et al. | |
| 2006/0041084 A1 | 2/2006 | Stokes et al. | |
| 2006/0135721 A1 | 6/2006 | Lange et al. | |
| 2006/0264577 A1 | 11/2006 | Faust et al. | |
| 2007/0155908 A1 | 7/2007 | Stokes et al. | |
| 2007/0155910 A1 | 7/2007 | Stokes | |
| 2007/0155911 A1 | 7/2007 | Stokes et al. | |

FOREIGN PATENT DOCUMENTS

| | | |
|---|---|---|
| DE | 240308 | 10/1986 |
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 206756 A2 | 12/1986 |
| EP | 255181 A1 | 2/1988 |
| EP | 342792 A1 | 11/1989 |
| EP | 400844 A1 | 5/1990 |
| EP | 0397081 A2 | 11/1990 |
| EP | 0 341 012 B1 | 12/1992 |
| EP | 959096 A1 | 11/1999 |
| EP | 1209170 A1 | 5/2002 |
| EP | 1489109 A2 | 12/2004 |
| GB | 2 184 738 | 7/1969 |
| GB | 1 159 368 | 4/1987 |
| JP | 2001172567 A | 6/2001 |
| WO | WO 90/05711 | 5/1990 |
| WO | WO 94/13706 | 6/1994 |
| WO | WO 97/19962 A1 | 6/1997 |
| WO | WO 99/09074 * | 2/1999 |
| WO | WO 00/75202 A1 | 12/2000 |
| WO | WO 2004/048215 A2 | 6/2002 |
| WO | WO 2003/106390 A1 | 12/2003 |
| WO | WO 2006110647 A1 | 10/2006 |

OTHER PUBLICATIONS

Young Cheol Bae and Rudolf Faust, B-Proton Elimination by Free Bases in the Living Carbocationic Polymerization of Isobutylene, Macromolecules 1997, 30, 7341-7344, 1997 American Chemical Society.

Young Cheol Bae and Rudolf Faust, β-Proton Elimination by Free Bases in the Living Carbocationic Polymerizatin of Isobuytlene, Macromolecules, 1997, 30, 7341-7344.

Lars V. Nielsen, Rasmus R. Nielsen, Bo Gao, Jorgen Kops and Bela Ivan, Synthesis Of Isobutenyl-Telechelic Polyisobutylene By Functionalization With Isobutenyltrimethylsilane; Polymer, vol. 38 No. 10, pp. 2529-2534, 1997, Elsevier Science Ltd, Great Britain.

De. P.; Faust, R. ACS Div. Polym. Chem., Polym. Preprs., 46, 847, 2005.

Bauer, R. F.; LaFlair, R. T.; Russell, K.E. Can. J. Chem., 48, 1251, 1970.

Bauer, R. F.; Russell, K. E. J. Poly. Sci., A-1(9), 1451, 1971.

Bezumnova et al. Khim. Geterosikl. Soedin. 80, 194, 1971.

Boileau, S.; Mazeaud-Henri, B.; Blackborow, R. European Polymer Journal, 39, 1395-1404, 2003.

Database WPI Section Ch. Week 197201 Derwent Publications Ltd. London, GB; AN 1972-00713T XP002316480—& SU 293 804 A (ND Zelinskii organic chem) Jan. 26, 1971 abstract.

Diaz, A. F.; Castillo, J. I. J. Chem. Soc., Chem. Comm, 397, 1980.

Diaz, A. F.; Kanazawa, K. K. J. Chem. Soc., Chem Comm., 635, 1979.

Faust, R., Kennedy, J. P. J. Macromol. Sci.—Chem., A27(6), 649-667, 1990.

Gardini, G. P. Adv. Heterocyl. Chem., 15(67), 1973.

Gonzales de la Campa, J., Pham, Q. Makromol. Chem., 182, 1415, 1981. (English Abstract).

Gorski, U.; Maenz, K., Stadermann, D. Die Angewandte Makromolekulare Chemie, 253, 51-64, 1997.

Hadjikyriacou, S.; Faust, R. Macromolecules, 32, 6394-6399, 1999.

Hadjikyriacou, S.; Faust, R. Macromolecules, 33, 730-733, 2000.

Ipatieff, V. N; Pines, H.; Friedman, B.S. J. Am. Chem. Soc. 60, 2731, 1938.

Kaszas, G.; Puskas, J. E.; Chen, C. C.; Kennedy, J.P.; Polymer Bulletin (Berlin), 20(5), 413-19, 1988.

Kennedy, J. P., Chang, V. S. C., Smith, R. A., Ivan, B. Polymer Bulletin, 1, 575-580, 1979.

Kennedy, J. P.; Guhaniyogi, S.C.; Percec, V. Poly. Bull., 8, 563-570, 1982.

Kennedy, J.P.; Hayashi, A. Journal of Macromolecular Science, Chemistry, A28(2), 197-207.

Kim, I and Faust, R. Journal of Macromlecular Science Part A—Pure and Applied Chemistry. A40(10), 991-1008, 2003.

Klemm et al. Angew Makromol. Chem., 207, 187, 1993. (English Abstract).

Klemm, E.; Bell, U. Polym. Bull. (Berlin) 28, 653, 1992.

Koroskenyi, B.; Faust, R. J.M.S.—Pure Appl. Chem., A36(12), 1879-1893, 1999.

Lenz, "Organic Chemistry of Synthetic High Polymers," (Section 7.2) Interscience Publishers, New York, p. 196, 1967.

Li, J.; Sung, S.; Tian, J.; Bergbreiter, D.E. Tetrahedron, 61, 12081-12092, 2005.

Maenz, K., Mollhoff, M., Stadermann, D. Acta Polymerica, 47(5), 208-213, 1996.

Maenz, K., Stadermann, D. Angewandte Makromolekulare Chemie, 242, 183-197, 1996.

Maenz, K., Stadermann, D. Angewandte Makromolekulare Chemie, 258, 69-73, 1998.

Martinez-Castro, N.; Lanzendo, M. G.; Muller, A. H.E.; Cho, J.C.; Acar, M. H.; Faust, R. Macromolecules, 36, 6985-6994, 2003.

Mishra, M.K.; Sar-Mishra, B.; Kennedy, J. P. Poly. Bull., 16, 47-53, 1982.

Morgan, C. R.; Magnotta, F.; Ketley, A. D. J. Polym. Sci. Polym. Chem. Ed., 15, 627, 1977.

Nielsen, L.V., Nielsen, R.R.; Bo, G.; Kops, J.; Ivan, B. Polymer, 38(10), 2529-2534, 1997.

Nuyken, O.; Reuschel, G.; and Siebzehnrubl. Makromol. Chem. Macromol. Symp, 26, 313, 1989.

Nuyken, O.; Volkel, T. Makromol. Chem. Rapid Commun. 11, 365, 1990.

Nuyken, O; Chang, V. S. C.; Kennedy, J. P. Polym. Bull. (Berlin), 4, 61-65, 1981.

Puskas et al. J. Polymer Sci: Symposium No. 56, 191.

Ronney, J. M. J. Appl. Poly. Sci. , 25, 1365-1372, 1980.

Roth, M.; Mayr, H. Macromolecules, 29, 6104-6109, 1996.

Serniuk, G.E.; Banes, F. W.; Swaney, M. W. J. Am. Chem. Soc. 70, 1804, 1948.

Shriescheim, A.; Kirshenbaum, I. Chemtech, 310, 1978.
Si, Jiaoshi; Kennedy, J.P., Polymer Bulletin (Berlin) 33(6), 651-6, 1994.
Stacey et al. Org. React, 13, pp. 150-208 and 233-333, 1963.
Storey, R. F.; Stokes, C. D.; Harrison, J. J. Macromolecules, 38(11), 4618-4624, 2005.
Zinger, B. and Miller, L. L. J. Am. Chem. Soc. vol. 106, 6861-6863, 1984.
Office Action mailed Dec. 5, 2008, U.S. Appl. No. 11/357,562.
Office Action mailed Jan. 8, 2009, U.S. Appl. No. 11/356,490.
Notice of Allowance mailed Dec. 3, 2008, U.S. Appl. No. 11/356,491.
Office Action mailed May 13, 2008, U.S. Appl. No. 11/359,491.
Office Action mailed Jan. 2, 2008, U.S. Appl. No. 11/207,377.
Office Action mailed Mar. 23, 2007, U.S. Appl. No. 11/207,377.
Office Action mailed Nov. 12, 2008, U.S. Appl. No. 11/207,264.
Office Action mailed Feb. 20, 2009, U.S. Appl. No. 11/186,157.
Office Action mailed Oct. 20, 2008, U.S. Appl. No. 11/186,157.
Office Action mailed Apr. 1, 2008, U.S. Appl. No. 11/186,157.
Notice of Allowance mailed May 11, 2005, U.S. Appl. No. 11/600,898.
Bae, et al., The Role of Pyridine Derivatives in Living Carbocationic Polymerization: Lewis Base or Nucleophile?, Macromol, Symp. vol. 132, pp. 11-23, 1998, Wiley-VCH Verlag GmbH, Weinheim.
Evsyijkov et al., "Chemical dehydrohalogenation of halogen-containing polymer", Russian Chemical Reviews, 60(4), 373-390, 1991.
Fodor et al., "Synthetic Applications of Non-Polymerizable Monomers in Living Carbocationic Polymerizations", ACS Div. Polym. Chem., Polym. Preprs., 35(2), 492-493, 1994.
Hadjikyriacou, et al., "Living Coupling Reaction in Living Cationic Polymerization. 4. Synthesis of Telechelic Polyisobutylenes Using Bis-Furanyl Derivatives as Coupling Agents", JMS PureApplChem, A37. 1333-1352, 2000.
Hamley, "Block Copolymers". Encyclopedia of Polymer Science and Technology. 457-482. Mar. 2003.
Iiigashihara et al.. Macromolecules, 39, 5275, 2006.

Ivan et al., "New telechelic polymers and sequential copolymers by polyfunctional initiator-transfer agents (inifers)", J. Poly. Chem. Ed., 18, 3177-3191, 1980.
Ivan et al., "Living carbocationic polymerization. XXX. One-pot synthesis of allyl-terminated linwar and tri-arm star polyisobutylenes, and epoxy-and hydroxy-telechelics therefrom", J. Polym. Sci.: Part A: Polym. Chem., 28, 89-104, 1990.
Keki et al., "Dimethyldioxirane as a New and Effective Oxidation Agent for the Epoxidation of a,w-Di(isobutenyl)polyisobutylene: A convenient Synthesis of a,w-Di(2-methyl-3-hydroxypropyl)-polyisobutylene", J. Poly. Sci. A Poly. Chem., 40, 3974-3986, 2002.
Kennedy et al., "New Telechelic Polymers and Sequential Copolymers by Polyfunctional Initiator-Transfer Agents (Inifers)", Polym. Bull., 9, 27-32, 1983.
Machl et al., "Novel Synthetic Routes to Aminofunctionalized Polyisobutylenes", ACS Div. Polym. Chem. Polym. Preprs., 44(2), 858-859, 2003.
Nemes et al., "Oxyethylation and Carbonation of Telechelic Polyisobutylene Anions", Poly. Bull. 24, 187-194, 1990.
Sawamoto et al., "End Functionalized Polymers by Living Cationic Polymerization", Macromolecules, 20(1), 1-6. 1987.
Ummadisetty et al., "Rapid Communication: Quantitative Syntheses of Novel Polyisobutylenes Fitted with Terminal Primary —Br, -Oh, -NH2, and Methacrylate Termini", J. Poly. Sci. A Poly. Chem., 46, 4236-4242, 2008.
Wallace et al., "Intelligent Polymer Systems", Encyclopedia of Polymer Science and Technology, 231-250, Jul. 2004.
Wollyung et al., "Intelligent Polymers Systems", J. Poly. Sci. A Poly. Chem., 43, 946-958, 2005.
Notice of Allowance mailed Aug. 6, 2009, U.S. Appl. No. 11/207,264.
Office Action mailed Aug. 31, 2009, U.S. Appl. No. 11/356,490.
Office Action mailed Aug. 7, 2009, U.S. Appl. No. 11/357,562.
U.S. Appl. No. 12/055.281 filed Mar. 25, 2008.

* cited by examiner

METHOD FOR PREPARATION OF POLYLEFINS CONTAINING EXO-OLEFIN CHAIN ENDS

This application claims the benefit of U.S. Provisional Application No. 60/603,423, filed Aug. 20, 2004.

FIELD OF THE INVENTION

The present invention is directed to a method for preparation of polyolefins containing exo-olefin chain ends. The method involves quenching a cationic quasi-living polyolefin polymer system with one or more nitrogen-containing five-membered aromatic ring compounds having at least two hydrocarbyl substituents attached to the ring.

BACKGROUND OF THE INVENTION

Linear polyolefins made using a mono-functional initiator containing a single "exo-olefin", "1,1-di-substituted" olefin, or "methylvinylidene," end group are useful precursors for the preparation of polymers containing specific functional end groups. Polymers made using multi-functional initiators would have multiple exo-olefinic end groups. Polymers containing specific end groups are useful as lubricating oil additives. One example of a functionalized polymer containing hetero atoms is polyisobutenylsuccinic anhydride. Functional end groups may also be desirable for making polymers with potential for further reactions.

Conventional ionic polymerizations can be anionic or cationic. Anionic polymerizations proceed, in the presence of a base, through carbanions and favor monomers having electron withdrawing groups. Cationic polymerizations proceed, in the presence of an acid, through a carbocation, also called a carbenium ion, and favor monomers that have electron releasing groups.

Similarly to the conventional polymerization systems, living polymerization systems may be either anionic or cationic. The difference between conventional polymerizations and living polymerizations is that an ideal living polymerization proceeds in the absence of chain transfer and chain termination. Living polymerization systems are of great commercial importance because the degree of polymerization may be controlled by controlling the feed ratio of monomer to initiator and sequential addition of two or more different monomers affords the ability to produce block copolymers. Polymerization continues until the monomer is exhausted, but the polymers retain their ability to add additional monomers any time in the future. A number of such systems are well known in the art.

A further development is the cationic quasi-living polymerization systems using conventional monomers. Quasi-living polymerization requires certain restrictive conditions, for example anhydrous reagents. Cationic quasi-living polymerizations differ from truly living polymerizations in that, although the rate of chain transfer approaches zero, chain termination is present but reversible. One important example of a cationic quasi-living polymerization is the cationic quasi-living polymerization of isobutylene.

Typically, cationic quasi-living polymerizations of isobutylene yield narrow molecular weight distribution and one major polymer product containing the 2-chloro-2-methylpropyl end group, also referred to as the "tert-chloride" end group. Under certain conditions minor amounts of olefinic isomers may also be produced.

On the other hand, there are two major olefinic isomers produced during conventional polymerization of isobutylene with $BF_3$, for example, the highly reactive exo-olefin isomer and the relatively unreactive 2-methyl-1-propenyl isomer, also referred to as the "tri-substituted" isomer or "endo olefin" isomer. Furthermore, conventional polymerizations of isobutylene yield polymers with broad molecular weight distributions or polydispersity indices.

Exclusive production of the exo-olefin isomer has not been previously achieved under conventional polymerization conditions.

There are two established methods for producing polyisobutylene containing only the exo-olefin end group. One method involves chemical dehydrohalogenation of tert-chloride terminated polyisobutylene using potassium tert-butoxide in a post polymerization reaction (U.S. Pat. No. 4,342,849). The other method involves in situ quenching of quasi-living isobutylene with methallyltrimethylsilane, which converts an active, living carbenium ion to the exo-olefin end group. (M. Roth and H. Mayr, *Macromolecules*, 29, 6104, 1996)

Polyisobutylene polymers containing more than one exo-olefin end group may be prepared using the above methods by the use of a multi-functional initiator.

The preparation of polyolefins, including polyisobutylene polymers, is well known in the art. A number of patents have discussed processes for making polyisobutylene polymers containing exo-olefin end groups, but none using quenching a cationic quasi-living polymerization system with one or more nitrogen-containing five-membered aromatic ring compounds.

European Patent No. 341012 discloses a method for producing polymers with narrow molecular weight distribution, where the ratio of the weight average molecular weight, $M_{(w)}$, to the number average molecular weight, $M_{(n)}$, approaches 1.

U.S. Pat. No. 4,152,499 discloses isobutylene polymers having a mean degree of polymerization from 10 to 100 and where the proportion of theoretically possible terminal double bonds is greater than in products prepared using aluminum trichloride. The patent also discloses the method of making the isobutylene polymers using boron trifluoride as the initiator.

U.S. Pat. No. 4,342,849 discloses the synthesis of polyisobutylene carrying either unsaturation or hydroxyl groups at both ends, in the case of a linear polymer, or at all ends in the case of a star polymer. The method involves the steps of refluxing a solution of telechelic di-halogen polyisobutylene, adding a solution strong base such as potassium t-butoxide and stirring to form the telechelic di-olefin polyisobutylene.

U.S. Pat. No. 4,393,199 discloses a method for carrying out cationic polymerization with molecular weight control in which a pre-initiator and a catalyst effective for cationic polymerization are mixed with a monomer. The resulting living polymer is then treated as desired.

U.S. Pat. No. 4,758,631 discloses a method of preparing allyl-terminated polyisobutylene by allylation with allyltrimethylsilane of tertiary chloro-capped polyisobutylene by electrophilic substitution. The synthesis begins with the boron trichloride catalyzed mono- or oligo-tertiary chloride "inifer" initiated polymerization of isobutylene, followed in the same reaction vessel by the addition of hexane, allyltrimethylsilane and titanium tetrachloride.

U.S. Pat. Nos. 4,910,321 and 5,122,572 disclose a catalyst composed of a complex of an organic acid or its ester and a Lewis acid, preferably boron trichloride that can add olefin monomers to increase the molecular weight of the complex from as low as 200 to in excess of a million. The patents also disclose polymers of different molecular weights having useful end groups such as halogens and specifically chloride, allyl, acryl or methacryl, acetate or formate.

U.S. Pat. Nos. 4,929,683 and 5,066,730 disclose a catalyst composed of a complex of an organic ether and a Lewis acid, preferably boron trichloride that can add olefin monomers to increase the molecular weight of the complex from as low as 200 to in excess of a million. The patents also disclose polymers of different molecular weights having useful end groups such as halogens and specifically chloride, allyl, acryl or methacryl, acetate or formate.

U.S. Pat. No. 5,219,948 discloses a method for preparing elastomeric polymers comprising alpha-olefins or conjugated alkadienes by cationic polymerization in the presence of titanium tetrachloride and an electron pair donor selected from pyridine or a non-hindered alkylpyridine. The polymers have very narrow, mono-modal molecular weight distribution.

U.S. Pat. No. 5,336,745 discloses a method for the direct synthesis of polymeric materials functionalized with desirable nitrogen-containing functional groups such as terminal azido, cyano, carbonylamino or thiocarbonylamino groups. Polymerization and functionalization occur in a substantially simultaneous manner.

U.S. Pat. No. 5,428,111 discloses a process for the living polymerization of aromatic, preferably styrenic monomers initiated from a living polyolefin, particularly polyisobutylene, chain end for making block copolymers having polyolefin mid-blocks and styrenic end-blocks.

U.S. Pat. No. 5,448,000 discloses a one-pot method of preparing sulfonic acid-terminated polyisobutylene by sulfonation with acetyl sulfate of a living polyisobutylene in a single step. The method involves "inifer" initiated carbocationic polymerization with Lewis acid to form the polymer followed by the sulfonation.

U.S. Pat. Nos. 5,637,647 and 5,677,386 disclose the capping of a living polymer with one or more capping compounds comprising non-polymerizable monomer selected from a group consisting of substituted or unsubstituted diphenyl alkylene, methoxystyrene, trans-stilbene, 1-isopropenylnaphthalene and 2,4-dimethyl styrene.

U.S. patent application Ser. No. 10/433,439, Publication No. 2004/0015029 A1, discloses a process for the preparation of polyisobutylenes in which at least 60 percent of the polymer chains have at least one olefinically unsaturated terminal group, by cationic polymerization of isobutylene or isobutylene-containing monomer mixtures in the condensed phase and in the presence of an initiator system.

U.S. patent application Ser. No. 10/600,898, Publication No. 2004/0260033 A1, discloses the method for manufacturing and producing monodisperse telechelic polymers through cationic polymerization of suitable monomer under living polymerization conditions and quenching the polymerization with an N-substituted-pyrrole. The functionalized polymers containing N-substituted-pyrroles may be employed as fuel additives and/or lubricating oil additives.

PCT International Application No. PCT/EP/05472, International Publication No. WO99/09074, discloses a process for functionalizing polymers prepared by cationic polymerization wherein a living carbocationic polymerization system is reacted with one or more aromatic ring systems, and the use of substituted or unsubstituted reaction products of said process in lubricating oil or fuel compositions and additive concentrates, for example as dispersants, detergents or antioxidant additives or VI improvers.

β-*Proton elimination by Free Bases in the Living cationic Polymerization of Isobutylene*, by Young Cheol Bae and Rudolf Faust, Macromolecules, Volume 30, 7341-7344 (1997). The authors investigated β-proton elimination from quasi-living polyisobutylene, after observing exo-olefin formation in the presence of 2,6-di-tert-butylpyridine (DTBP) of low purity. They ascribed elimination to the presence of a sterically hindered cyclic imine base present in the DTBP in a concentration of $6\times10^{-6}$ moles per liter. They simulated this impurity using 2-tert-butylpyridine (TBP) and discovered that the latter, when added to the reactor at the start of the polymerization (i.e., in the presence of monomer) resulted in about 65 percent elimination after 3 hours of reaction time to produce exclusively exo-olefin. When the extent of elimination had reached 20 percent or higher, significant coupling was observed from both $^1$H NMR and GPC analyses. Bae and Faust clearly considered that elimination by sterically hindered bases such as TBP was undesirable and should be avoided. The first paragraph of the paper was summarized as follows: "Finally, strong bases may also eliminate β-protons, which should be avoided." Later, they refer to the cyclic imine base impurity in DTBP as "the culprit". Finally, they summarized the entire paper by saying that the elimination process should be avoided for polymer preparation purposes, although it might facilitate the measurement of kinetic rate constants: "While β-proton elimination should be avoided for the synthesis of well-defined macromolecules, if diffusion control of this process can be shown, it may provide a novel method of establishing the concentration of active centers, from which absolute propagation rate constants could be calculated."

SUMMARY OF THE INVENTION

The present invention is directed to a method for the preparation of polyolefins containing exo-olefin chain ends. The method involves quenching a cationic quasi-living polyolefin polymer system with one or more nitrogen-containing five-membered aromatic ring compounds having at least two hydrocarbyl substituents attached to the ring. The method also involves use of Lewis acid and an electron donor, or a common ion salt or its precursor to form the cationic quasi-living polyolefin polymer to which is added the quenching agent to form the polymer product.

More specifically, the present invention is directed to a method for preparing a polyolefin containing one or more exo-olefinic end groups on the polymer chain, comprising quenching a cationic quasi-living polyolefin polymer system with one or more nitrogen-containing five-membered aromatic ring compounds selected from pyrroles and imidazoles having at least two hydrocarbyl substituents attached to the aromatic ring, provided the nitrogen containing five-membered aromatic ring is not:

(a) 2,4-dimethylpyrrole;
(b) 1,2,5-trimethylpyrrole;
(c) 2-phenylindole;
(d) 2-methylbenzimidazole;
(e) 1,2-dimethylimidazole;
(f) 2-phenylimidazole; and
(g) 2,4,5-triphenylimidazole.

Preferably the quenching is carried out at a temperature in the range of from about −130° C. to about 10° C. More preferably the quenching is carried out at a temperature from about −80° C. to about 0° C., and even more preferably from about −72° C. to about −10° C. Most preferably the quenching is carried out at a temperature in the range of from about −60° C. to about −20° C.

Preferably the polyolefin is polyisobutylene.

In a preferred embodiment of the present invention the polyolefin is prepared in situ.

The nitrogen-containing five-membered aromatic ring employed in an embodiment of the present invention is a substituted pyrrole.

The substituted pyrrole employed in the method of the present invention has the general formula:

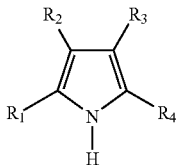

wherein:
(a) $R_1$ and $R_4$ are independently alkyl containing one carbon atom to about 20 carbon atoms, $R_2$ and $R_3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R_1$ and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(c) $R_2$ and $R_3$ form a fused aromatic ring of from 6 carbon atoms to 10 carbon atoms or an aliphatic ring of from 4 carbon atoms to about 8 carbon atoms, and $R_1$ and $R_4$ are independently alkyl containing one carbon atom to about 20 carbon atoms; or
(d) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms.

Preferably in the above method $R_1$ and $R_4$ are methyl and $R_2$ and $R_3$ are hydrogen.

In another preferred embodiment of the above method $R_1$, $R_2$, $R_3$ and $R_4$ are methyl.

In another preferred embodiment $R_1$ and $R_2$ are methyl and $R_3$ and $R_4$ form a fused benzo ring.

In a preferred embodiment the substituted-pyrrole has the following formula:

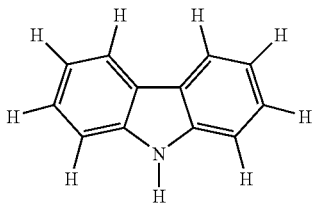

The nitrogen-containing five-membered aromatic ring employed in another embodiment of the present invention is a substituted imidazole.

The substituted imidazole in the method of the present invention has the general formula:

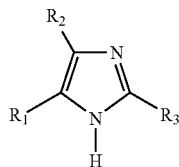

wherein $R_3$ is branched alkyl containing from about 4 carbon atoms to about 20 carbon atoms, and wherein
(a) $R_1$ and $R_2$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R_1$ and $R_2$ form a fused aromatic ring of from 6 carbon atoms to 10 carbon atoms or an aliphatic ring of from 4 carbon atoms to 8 carbon atoms.

In another preferred embodiment of the above method $R_1$ is methyl, $R_2$ is hydrogen and $R_3$ is tert-butyl.

Preferably the alkyl group on the nitrogen-containing five-membered aromatic ring in the method of the present invention has from about one carbon atom to about 20 carbon atoms. More preferably the alkyl group on the alkyl-substituted nitrogen-containing five-membered aromatic ring has from about one carbon atom to about 12 carbon atoms. Most preferably the alkyl group on the alkyl-substituted nitrogen-containing five-membered aromatic ring has from about one carbon atom to about 4 carbon atoms.

In the above method of the present invention the polyolefin is prepared by quenching a quasi-living polyolefin polymer product containing tert-chloride chain ends or a mixture comprising terminal olefinic chain ends and terminal tert-chloride chain ends with the nitrogen-containing five-membered aromatic ring in the presence of a Lewis acid.

In yet another embodiment of the present invention the polyolefin is prepared by quenching a quasi-living polyolefin polymer product containing a terminal tert-chloride chain end with the nitrogen-containing five-membered aromatic ring in the presence of a Lewis acid.

Preferably the Lewis acid is a halide of titanium or boron. More preferably the Lewis acid is a titanium halide. Most preferably the Lewis acid is titanium tetrachloride. Preferred concentrations of the titanium tetrachloride exceed 2 times the combined concentrations of protic impurities, electron donor, common ion salt or its precursor, and the quenching agent or quenching agents.

The polyolefin product obtained using the method of the present invention has exo-olefin chain ends in the range of one percent to 100 percent based on the total chain ends. Preferably the polyolefin product has at least 3 percent exo-olefin chain ends, more preferably at least 20 percent exo-olefin chain ends, even more preferably at least 50 percent exo-olefin chain ends, still more preferably at least 70 percent exo-olefin chain ends, and still more preferably 90 percent exo-olefin chain ends. Most preferably the polyolefin product has at least 99 percent exo-olefin chain ends based on the total chain ends.

In the method of the present invention the quasi-living polyolefin polymer is formed by contacting at least one cationically polymerizable monomer with an initiator, in the presence of a Lewis acid under reaction conditions suitable for quasi-living polymerization. Preferably the at least one cationically polymerizable monomer comprises at least one of isobutylene, 2-methyl-1-butene, 3-methyl-1-butene, 4-methyl-1-pentene, and beta-pinene. More preferably the at least one cationically polymerizable monomer is isobutylene.

In the method of the present invention two or more different cationically polymerizable monomers may be employed.

In the method of the present invention the initiator may be mono-functional or multi-functional. Preferably the initiator is mono-functional or di-functional. More preferably the initiator is mono-functional.

In the method of the present invention the mono-functional initiator comprises at least one of 2-chloro-2-phenylpropane; 2-acetoxy-2-phenylpropane; 2-propionoxy-2-phenylpropane, 2-methoxy-2-phenylpropane, 2-ethoxy-2-phenylpropane, 2-chloro-2,4,4-trimethylpentane, 2-acetoxy-2,4,4-trimethylpentane, 2-propionoxy-2,4,4-trimethylpentane, 2-methoxy-2,4,4-trimethylpentane, and 2-ethoxy-2,4,4-trimethylpentane.

In the method of the present invention the di-functional initiators include 1,3-di(2-chloro-2-propyl)-5-tert-butylbenzene, 1,4-di(2-chloro-2-propyl)benzene, 1,4-di(2-acetoxy-2-propyl)benzene, 1,3-di(2-acetoxy-2-propyl)-5-tert-butylbenzene, 1,3-di(2-methoxy-2-propyl)-5-tert-butylbenzene and 1,4-di(2-methoxy-2-propyl)benzene.

In the method of the present invention an example of a multi-functional initiator is 1,3,5-tri(2-chloro-2-propyl)-benzene.

In the method of the present invention the molecular weight distribution, $M_w/M_n$, of the polyolefin polymer is present in the range of about 1.01 to about 3.0. Preferably the molecular weight distribution, $M_w/M_n$, of the polyolefin polymer is present in the range of about 1.1 to about 2.0. More preferably the molecular weight distribution, $M_w/M_n$, of the polyolefin polymer is less than 1.5.

The present invention is also directed to a further method for preparing a polyolefin containing one or more exo-olefinic end groups on the polymer chain, comprising quenching a cationic quasi-living polyolefin polymer system with one or more nitrogen-containing five-membered aromatic ring compounds selected from pyrroles and imidazoles having at least two hydrocarbyl substituents attached to the aromatic ring, wherein the nitrogen-containing five-membered aromatic ring compounds are pre-reacted with a Lewis acid, and provided the nitrogen containing five-membered aromatic ring is not:
(a) 2,4-dimethylpyrrole;
(b) 1,2,5-trimethylpyrrole;
(c) 2-phenylindole;
(d) 2-methylbenzimidazole;
(e) 1,2-dimethylimidazole;
(f) 2-phenylimidazole; and
(g) 2,4,5-triphenylimidazole.

In a preferred embodiment of the above method the Lewis acid is $TiCl_4$.

In a further preferred embodiment of the above method nitrogen-containing five-membered aromatic ring compound is 2,5-dimethylpyrrole.

In another preferred embodiment of the above method nitrogen-containing five-membered aromatic ring compound is 2,3-dimethylindole.

DETAILED DESCRIPTION OF THE INVENTION

Definitions

As used herein, the following terms have the following meanings unless expressly stated to the contrary:

The term "alkyl" as used herein refers to straight chain and branched chain saturated aliphatic groups typically having from one carbon atom to about 20 carbons atoms. Some examples of straight chain and branched chain saturated aliphatic groups are methyl, ethyl, propyl, butyl, isopropyl, isobutyl, sec-butyl, tert-butyl, and the like.

The term "aromatic or aliphatic fused ring" as used herein refers to the ring formed by two adjacent carbon atoms on the pyrrole or imidazole ring, and the ring thus formed is fused to the pyrrole or imidazole ring. An example of a fused aromatic ring is a benzo group fused to the pyrrole ring or imidazole ring. A fused aliphatic ring may be any cyclic ring structure fused to the pyrrole ring or imidazole ring.

The term "branched alkyl" as used herein refers to an alkyl group in which the carbon atom representing the point of attachment of the group to the rest of the molecule is either a tertiary or quaternary carbon atom. The term "tertiary carbon" as used herein refers to a carbon atom that is attached to three other carbon atoms. The term "quaternary carbon" as used herein refers to a carbon atom that is attached to 4 other carbon atoms.

The terms "carbenium ion" or "carbocation" as used herein refer to a positively charged carbon atom bearing three $sp^2$-bonded substituents and an empty p orbital.

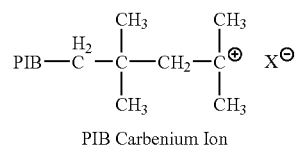

PIB Carbenium Ion

The term "chain transfer" as used herein refers to the cessation of growth of one polymerization chain with the possible initiation of another polymerization chain.

The term "common ion salt" as used herein refers to an ionic salt that is optionally added to a quasi-living cationic polymerization mixture to prevent dissociation of the propagating carbenium ion and counter-ion pairs. The anion of the common ion salt is identical to the counter-ions of the propagating chain ends. The cation of the common ion salt is typically a fatty quaternary ammonium cation, such as tetra-n-butyl ammonium ion, which confers solubility in the organic media.

The term "common ion salt precursor" as used herein refers to an ionic salt, optionally added to a quasi-living cationic polymerization mixture, which generates counter-anions that are identical to those of the propagating chain ends, via in situ reaction with the Lewis acid. An example is tetra-n-butylammonium chloride.

The term "controlled molecular weight distribution" as used herein refers to polyolefin polymers having a desired molecular weight distribution. The molecular weight distribution or polydispersity index (PDI) herein is calculated by dividing the average molecular weight of the polymer chains by the number average molecular weight, $M_w/M_n$.

The term "coupled product" as used herein refers to the product of addition of a PIB terminal carbenium ion to a PIB exo-olefin chain end. Coupled product has a number average molecular weight that is approximately twice that of the main polymer product.

The term "coupling" as used herein refers to the addition of a polyisobutylene terminal carbenium ion to a polyisobutylene exo-olefin chain end.

The term "conventional polymerization" as used herein refers to polymerization wherein the chain-reaction polymerization involving olefins proceeds with ions as chain carrying particles, either anions or cations. Polymerization proceeds through the steps of chain initiation, chain propagation, chain transfer and chain termination.

The term "di-EAS product" as used herein refers to the product which results when two separate polyisobutylene terminal carbenium ions react to form a covalent bond with a single quenching agent molecule. Di-EAS product contains in its structure a residue from the quenching agent.

The terms "di-substituted olefin" or "exo-olefin" or "methyl vinylidene" as used herein refer to an olefin polymer chain containing an exo-olefin chain end as shown below.

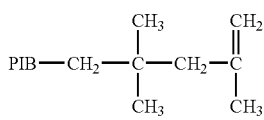

The term "EAS product" as used herein refers to the product which results when one polyisobutylene terminal carbenium ion reacts to form a covalent bond with a single quenching agent molecule. EAS product contains in its structure a residue from the quenching agent.

The term "electron donor" as used herein refers to a basic and/or nucleophilic substance added to the polymerization reaction that is either fully complexed with the Lewis acid or fully non-complexed with the Lewis acid. The concentration of electron donor exceeds the concentration of the protic impurities, for example water.

The term "electrophilic aromatic substitution or EAS" as used herein refers to the process by which the EAS product is produced.

The term "gem-dimethyl carbons" as used herein refers to the two methyl carbons alpha to the carbenium ion or the chloride bonded carbon of the polyolefin polymer chain end as depicted in the structure below.

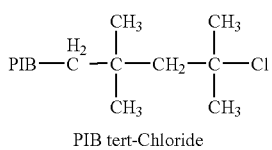

PIB tert-Chloride

The term "hydrocarbyl" refers to an organic radical primarily composed of carbon and hydrogen which may be aliphatic, alicyclic, aromatic or combinations thereof, e.g., aralkyl or alkaryl. Such hydrocarbyl groups may also contain aliphatic unsaturation, i.e., olefinic or acetylenic unsaturation, and may contain minor amounts of heteroatoms, such as oxygen or nitrogen, or halogens, such as chlorine.

The term "initiator" as used herein refers to the chemical moiety that starts the polymerization and satisfies the valence at the head of the polymer chain, or the molecule that provides that moiety. When a mono-functional initiator is used, the chain end (CE) concentration equals the initiator concentration. For a multi-functional initiator, when the functionality of the initiator equals x, then the chain end concentration equals x times initiator concentration.

The term "Lewis acid" as used herein refers to a compound that can accept a pair of electrons to form a covalent bond.

The term "living polymerization" as used herein refers to the polymerizations that proceed in the absence of measurable chain transfer and chain termination.

The term "nitrogen-containing five-membered aromatic ring" as used herein refers to pyrroles and imidazoles containing at least one nitrogen atom in the aromatic ring and a maximum of 2 nitrogen atoms in the aromatic ring, and having from about 2 alkyl groups to about 4 alkyl groups containing from about one carbon atom to about 20 carbon atoms attached to the ring. Some examples of nitrogen-containing five-membered aromatic ring compounds contemplated for use in the present invention are substituted-pyrroles.

The term "quasi-living polymerization" as used herein refers to living polymerizations wherein reversible chain terminations is operable, but irreversible chain termination and chain transfer approaches zero.

The term "quenching agent" as used herein refers to a chemical compound which is added to the polymerization reactions to react with the growing chain end.

The term "polyolefin" as used herein refers to a polymer produced by the addition polymerization of one or more olefins, such as ethylene, propylene, styrene, isobutylene, etc.

The term "protic impurity" as used herein refers to impurities within the polymerization reaction mixture that contain acidic hydrogen atoms in their structure, for example, water.

The term "regiospecific" as used herein refers to chemical reactions that give exclusively or nearly exclusively one of several possible isomeric products.

The term "termination" as used herein refers to the chemical reaction that terminates polymerization process or the quenching reaction by destruction of the Lewis acid.

The term "terminator" as used herein refers to the chemical compound that terminates polymerization process or the quenching reaction, but may not simultaneously initiate a new polymer chain. A number of alcohols may be used as terminators.

The term "tert-chloride" refers to the 2-chloro-2-methyl-propyl end group on a polyolefin polymer chain.

Unless otherwise specified, all percentages are in weight percent.

It has been determined that the nitrogen-containing five-membered aromatic ring compounds, such as substituted-pyrroles and substituted-imidazoles, used as quenching agents in the preparation of polyolefin polymers of the present invention are capable of quantitatively converting polyolefin polymer endo-olefin chain ends and tert-chloride chain ends to the exo-olefin chain ends. Without being bound by any theory it is believed that these quenching agents selectively catalyze the elimination of a proton exclusively from the gem-dimethyl carbon of the polyisobutylene chain end as shown below.

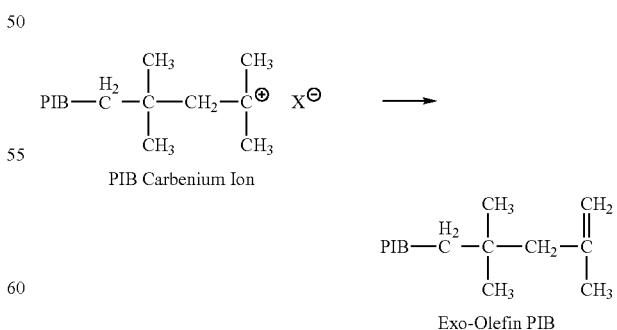

This result was unexpected since the quenching agents with very similar structures are known in the prior art to quench quasi-living cationic polymerizations by an electrophilic aromatic substitution (EAS) mechanism as disclosed in U.S. patent application Ser. No. 10/600,898. Compounds which provide the highest EAS yields are typically substituted with electron donating groups located at strategic positions on the ring. It is believed that these substituents provide stabilization for the Friedel-Craft intermediates formed when, for example, polyisobutylene carbenium ions react with olefins in the ring.

The quenching agents used in the present invention are able to quantitatively convert polyolefin polymer containing olefinic chain ends and tert-chloride chain ends to the exo-olefin chain ends independently of whether a mono-functional initiator is used or a multi-functional. Furthermore, the rate of conversion is the same for mono-functional and di-functional initiators. A 100 percent conversion was observed within 15 minutes after addition of quenching agent to quasi-living cationic polyisobutylene chains initiated with the mono-functional initiator, 2-chloro-2,4,4-trimethyl pentane. Similar results were obtained with the di-functional initiator 1,3-di (2-chloro-2-propyl)-5-tert-butylbenzene.

Temperature dependence was observed for the preparation of the polyisobutylene polymers containing a high concentration of exo-olefin chain ends based on the total chain ends. It has been found that raising the reaction temperature increases the yield of exo-olefin by suppressing coupling. The data indicate that essentially quantitative conversion to exo-olefin was achieved within 15 minutes at $-60°$ C. and $-50°$ C. with no coupling. However, some coupling was observed at $-70°$ C. in the $^1$H NMR and GPC spectra. Coupling is seen as a peak centered at 4.82 just up-field from the exo-olefin peak at 4.85 parts per million peak in the $^1$H NMR spectrum and also in the GPC spectrum, represented by a low elution volume shoulder on the main peak.

In the method of the present invention, it is critical that certain principles be observed when designing the conditions for quasi-living polymerization and subsequent quenching. Without being bound by any theory, it is believed that the desired elimination reaction is always in competition with the production of coupled product through reaction of the carbenium ion with already-formed exo-olefin. Therefore conditions must be sought that favor elimination and disfavor coupling.

Higher reaction temperature has been found to favor elimination and disfavor coupling. In quasi-living cationic polymerization of isobutylene, an equilibrium exists between active, carbenium ions and dormant, tert-chloride chain ends. When the temperature of the system is raised, this equilibrium increasingly favors the dormant chain ends, but this should decrease the rates of elimination and coupling to an equal extent. However, higher temperature also should displace the equilibrium for the complex between quenching agent and Lewis acid toward un-complexed quenching agent, which is believed to be the agent that causes elimination. Raising the temperature thus provides a competitive advantage to the desired reaction. Temperature cannot be increased without limit, however, because the exo-olefin product begins to be contaminated with small fractions of endo olefin.

Chain-end concentration and its relationship to quenching agent concentration and Lewis acid concentration are also critical. Higher chain-end concentrations, which become necessary when low molecular weights are targeted, preferentially favor olefin coupling since that process is second order in polymer chains. Therefore, to maintain the desired dominance of the rate of elimination, quenching agent concentration and/or temperature must be raised. Both of these changes, however, have the undesirable effect of reducing the concentration of carbenium ions and thus retarding the conversion of chain ends to exo-olefin. Increasing quenching agent concentration diminishes the concentration of Lewis acid through the formation of a complex between quenching agent and Lewis acid, and this strongly diminishes carbenium ion concentration since the latter varies approximately with the square of the Lewis acid concentration. Therefore, recipes targeting low molecular weight must be formulated with higher quenching agent concentrations and higher Lewis acid concentrations and preferably run at higher temperatures. A expedient way to reduce coupling at any target molecular weight is to dilute all reactants with additional diluent.

It has been found that in the presence of sufficient concentrations of a basic electron donor, complete conversion to exo-olefin chain ends can be attained when the quenching agent concentration is but a fraction of the quasi-living chain end concentration. This suggests that under these conditions, the quenching agent removes a proton from the carbenium ion and subsequently transfers the proton to the electron donor, that is, the quenching agent acts only as a catalyst for elimination, and the electron donor serves as proton acceptor. The use of a less-than-stoichiometric concentration (relative to chain ends) of quenching agent could confer economic advantages in practicing the method the present invention. On the other hand, in the absence of a basic electron donor, for example, when the latter is replaced by a common ion salt or its precursor, it has been found that complete conversion of the chain ends to exo-olefin requires a stoichiometric or higher concentration of quenching agent. Under these conditions the quenching agent serves both as catalyst and proton acceptor.

General Procedure for Preparation of Polyolefin Polymers Containing Exo-Olefin End Groups on the Chain A typical procedure for the preparation of polyolefin polymers of the present invention is given below:

The method of the present invention may be conducted as a batch process, a continuous process, a semi-batch process or by any process known by persons skilled in the art.

The polymerization reaction is carried out under inert gas and in a substantially anhydrous environment. The reactor is charged with the following reactants:
1. a diluent,
2. an initiator,
3. an electron donor or common ion salt, or its precursor,
4. one or more monomers, and
5. a Lewis acid, which typically comprises a halide of titanium or boron;

The reaction mixture is equilibrated at the desired temperature, ranging from about $-130°$ C. to about $10°$ C. The method of the present invention may be carried out at any desired pressure, atmospheric, sub-atmospheric or super-atmospheric pressure.

The progress of the polymerization reaction is monitored in situ by determination of the amount of monomer remaining in the reaction mixture. After high conversion of the monomer is observed, an aliquot is removed for determination of the pre-quench chain end composition before addition of the quenching agent. The polymerization reaction in the aliquot is terminated with an appropriate alcohol equilibrated at the desired temperature.
6. One or more nitrogen-containing five-membered ring quenching agents is added to the reaction mixture to quench the polymerization reaction.

Although, the concentration of the reactants may be varied to obtain the desired product, it has been found that certain ratios of the reactants are important for obtaining high exo-olefin chain end yield. The ratios are described below:

The molar ratio of monomer to initiator is in the range from about 3:1 to about 20,000:1. Preferably the molar ratio of monomer to initiator is in the range of about 5:1 to about 2,000:1. More preferably the molar ratio of monomer to initiator is about 10:1 to 150:1. The mole ratio of monomer to initiator controls the final molecular weight of the polyolefin.

The molar ratio of Lewis acid to chain ends is in the range from about 0.1:1 to about 2,500:1. Preferably the molar ratio of Lewis acid to chain ends is in the range of about 2:1 to about 200:1. More preferably the molar ratio of Lewis acid to chain ends is about 2:1 to 15:1.

The molar ratio of Lewis acid to electron donor is in the range from about 1.1:1 to about 10,000:1. Preferably the molar ratio of Lewis acid to electron donor is in the range of about 2:1 to about 100:1. More preferably the molar ratio of Lewis acid to electron donor is about 4:1 to 30:1.

The molar ratio of Lewis acid to quenching agent is in the range from about 1.1:1 to about 2,500:1. Preferably the molar ratio of Lewis acid to quenching agent is in the range of about 2:1 to about 100:1. More preferably the molar ratio of Lewis acid to quenching agent is about 2:1 to 15:1.

The molar ratio of quenching agent to chain ends is in the range from about 0.25:1 to about 20:1. Preferably the molar ratio of quenching agent to chain end is in the range of about 0.5:1 to about 5:1. More preferably the molar ratio of quenching agent to chain end is about 0.5:1 to 4:1.

Additional aliquots are removed from the reaction mixture at various time intervals after addition of the quenching agent to determine the concentration of the exo-olefin chain ends on the polyolefin polymers. The polymerization reaction is terminated in all the aliquot samples and the remaining reaction mixture with an appropriate alcohol equilibrated at the desired temperature.

The concentration of the exo-olefin chain ends, along with the concentration of the endo-olefin and tert-chloride chain ends, is quantified using $^1$H NMR. GPC spectra are also obtained to qualitatively determine the amount of the EAS product, the di-EAS product and the coupled product.

Compounds suitable for use in the preparation of the polyolefin polymers of the present invention are given below:

Diluents

Diluents influence the ionization equilibria and rates of exchange of growing species through their polarity, which can be estimated from their dielectric constants. Typically, solvents having low dielectric constants are preferred since ion pairs are less dissociated. Suitable solvents include, but are not limited to, low-boiling alkanes and alkyl mono or polyhalides with reasonably low freezing points to be used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, isohexane, 3-methylpentane, 2,2-dimethylbutane, 2,3-dimethylbutane and the like), alkenes and alkenyl halides (such as vinyl chloride), carbon disulfide, chloroform, ethylchloride, N-butyl chloride, methylene chloride, methyl chloride, 1,2-dichloroethane, 1,1,2,2-tetrachloroethane, sulfur dioxide, acetic anhydride, carbon tetrachloride, acetonitrile, neopentane, benzene, toluene, methylcyclohexane, chlorobenzene, 1,1-dichloroethane, 1,1-dichloroethene, 1,2-dichloroethene, n-propyl chloride, iso-propyl chloride, 1,2-dichloropropane, or 1,3-dichloropropane, nitro-alkanes (such as nitropropane) to name a few of the representative liquid diluents or solvents useful in cationic polymerizations. Mixed solvents (for example combinations of those listed above) can also be used.

Initiators

Initiator compounds for living and quasi-living carbocationic polymerization are well known in the art. Initiators may be mono-functional or multi-functional depending on the desired product. Mono-functional and di-functional initiators are employed when the desired polymer is to be linear. For making star polymers the initiator should have more than two reactive moieties. The contemplated initiator compounds can be represented by the general formula $(X'—CR_aR_b)_nR_c$ wherein $R_a$, $R_b$ and $R_c$ are independently comprises at least one of alkyl, aromatic, alkyl aromatic groups, and can be the same or different, and X' is an acetate, etherate, hydroxyl group, or a halogen. $R_c$ has a valence of n, and n is an integer of one to 4. Preferably $R_a$, $R_b$ and $R_c$ are hydrocarbon groups containing one carbon atom to about 20 carbon atoms, preferably one carbon atom to about 8 carbon atoms. Preferably X' is a halogen and more preferably chloride. In some instances it is preferable to select the structure of $R_a$, $R_b$ and $R_c$ to mimic the growing species or monomer, e.g. a 1-phenylethyl derivative for polystyrene or 2,4,4-trimethyl pentyl derivative for polyisobutylene. Suitable compounds, include for example, cumyl, dicumyl and tricumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetyl-2-phenylpropane, i.e., cumyl acetate; 2-propionyl-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether), and similar compounds. Other suitable examples can be found in U.S. Pat. No. 4,946,899. Particularly preferred examples are 2-chloro-2,4,4-trimethyl pentane (TMPCl), 1,3-di(2-chloro-2-propyl)benzene, 1,3,5 tri(2-chloro-2-propyl)benzene, and 1,3-di(2-chloro-2-propyl)-5-tert-butylbenzene (bDCC).

The concentration of the chain ends in the total reaction mixture may be in the range from about 0.0001 moles per liter to about 2.0 moles per liter. Preferably the concentration of the chain ends is in the range from about 0.001 moles per liter to about 1.0 moles per liter. More preferably the concentration of the chain ends is in the range from about 0.005 moles per liter to about 0.5 moles per liter.

Electron Donors

Electron donors have been shown to convert traditional polymerization systems into living and/or quasi-living cationic polymerizations systems. The electron donor used in the present invention is not specifically limited to any particular compound or class of compounds. Examples include pyridines and alkyl amines, aprotic amides, sulfoxides, esters, metal compounds having an oxygen atom bonded to a metal atom, and others. Pyridine compounds include 2,6-di-tert-butylpyridine, 2,6-dimethylpyridine, 2,4-dimethylpryidine, 2,4,6-trimethylpyridine, 2-methylpyridine and pyridine. N,N-dimethylaniline and N,N-dimethyltoluidine may be also employed. Amide compounds include N,N-dimethylformamide, N,N-dimethylacetamide and N,N-diethylacetamide.

An example of a sulfoxide compound is dimethyl sulfoxide. Diethyl ether is an example of an ether compound, and methyl acetate and ethyl acetate are examples of ester compounds. Phosphate compounds such as trimethyl phosphate, tributyl phosphate, triamide hexamethylphosphate may also be employed. Oxygen-containing metal compounds such as tetraisopropyl titanate are also useful as electron donors.

The concentration of the electron donors in the total reaction mixture may be in the range from about 0.001 moles per liter to about 0.1 moles per liter. Preferably the concentration of the electron donors is in the range from about 0.001 moles per liter to about 0.05 moles per liter. More preferably the concentration of the electron donors is in the range from about 0.002 moles per liter to about 0.02 moles per liter.

Common Ion Salts and Common Ion Salt Precursors

Common ion salts or salt precursors may be optionally added to the reaction mixture in addition to or replacement of the electron donor. Typically, these salts are used to increase the ionic strength, suppress free ions, and beneficially interact with ligand exchange. Particularly preferred are common ion salt precursors, for example tetra-n-butylammonium chloride (n-Bu$_4$NCl).

The concentration of the common ion salts or salt precursors in the total reaction mixture may be in the range from about 0.0005 moles per liter to about 0.05 moles per liter. Preferably the concentration of the common ion salts or salt precursors is in the range from about 0.0005 moles per liter to about 0.025 moles per liter. More preferably the concentration of the common ion salt or salt precursors is in the range from about 0.001 moles per liter to about 0.007 moles per liter.

Monomers

Suitable monomers for use in the method of the present invention are hydrocarbon monomers, i.e., compounds containing only hydrogen and carbon atoms, especially olefins and diolefins, and normally those having from about 2 to about 20, but preferably from about 4 to about 8 carbon atoms. The process can be employed for the polymerization of such monomers to produce polymers of different, but uniform molecular weights, for example, from about 300 to in excess of a million g/mol. Such polymers can be low molecular weight liquid or viscous polymers having a molecular weight of from about 200 to 10,000 g/mol, or solid waxy to plastic, or elastomeric materials having molecular weights of from about a 100,000 to 1,000,000 g/mol, or more. Suitable monomers include such compounds as isobutylene, styrene, beta pinene, isoprene, butadiene, substituted compounds of the preceding types, and others. Particularly preferred monomers are isobutylene, 2-methyl-butene, 3-methyl-1-butene, 4-methyl-1-pentene, and beta-pinene. An even more preferred monomer is isobutylene. Mixtures of monomers may be used.

The concentration of the monomers in the total reaction mixture may be in the range from about 0.01 moles per liter to about 5.0 moles per liter. Preferably the concentration of the monomers is in the range from about 0.1 moles per liter to about 2.0 moles per liter. More preferably the concentration of the monomers is in the range from about 0.3 moles per liter to about 1.0 moles per liter. Most preferably the concentration of the monomers is 0.5 moles per liter.

Lewis Acids

Lewis acids that are suitable as catalysts for purposes of the invention include, but are not limited to, titanium and boron halides, particularly titanium tetrachloride and boron trichloride. Use of the titanium halides and particularly titanium tetrachloride is preferred. The strength of the Lewis acid and its concentration should be adjusted for the particular monomer. Additionally, the strength of these Lewis acids can be adjusted using nucleophilic additives. In some instances these Lewis acids are also referred to as co-initiators.

The amount of the Lewis acid present in the initiator system may vary. However, it is desirable that the concentration of Lewis acid is sufficient to achieve an appropriate rate of polymerization and quenching. The Lewis acid concentration should not be so high as to precipitate the formed polymer.

The concentration of the Lewis acid in the total reaction mixture may be in the range from about 0.001 moles per liter to about 3.0 moles per liter. Preferably the concentration of the Lewis acid is in the range from about 0.005 moles per liter to about 1.5 moles per liter. More preferably the concentration of the Lewis acid is in the range from about 0.05 moles per liter to about 1.0 moles per liter.

Quenching Agents

Quenching agents contemplated for use in preparation of the polyolefin in the present invention are nitrogen-containing five membered aromatic ring compounds such as substituted-pyrroles and substituted-imidazole.

The substituted-pyrrole employed in the method of the present invention has the general formula:

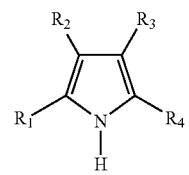

wherein:
(a) $R_1$ and $R_4$ are independently alkyl containing one carbon atom to about 20 carbon atoms, $R_2$ and $R_3$ are independently hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or (b) $R_1$ and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or (c) $R_2$ and $R_3$ form a fused aromatic ring of from 6 carbon atoms to 10 carbon atoms or an aliphatic ring of from 4 carbon atoms to about 8 carbon atoms, and $R_1$ and $R_4$ are independently alkyl containing one carbon atom to about 20 carbon atoms; or (d) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms.

The nitrogen-containing five-membered aromatic ring employed in another embodiment of the present invention is a substituted imidazole.

The substituted imidazole in the method of the present invention has the general formula:

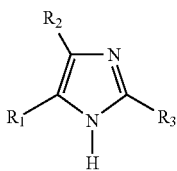

wherein $R_3$ is branched alkyl containing from about 4 carbon atoms to about 20 carbon atoms, and wherein
  (a) $R_1$ and $R_2$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
  (b) $R_1$ and $R_2$ form a fused aromatic ring of from 6 carbon atoms to 10 carbon atoms or an aliphatic ring of from 4 carbon atoms to 8 carbon atoms.

Structures of other nitrogen-containing five-membered aromatic ring compounds that may be employed in the method of the present invention are given below. The given structures are only intended as examples and in no way limit the scope of the present invention.

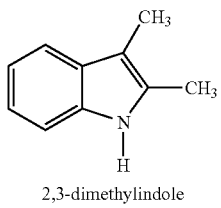
2,3-dimethylindole

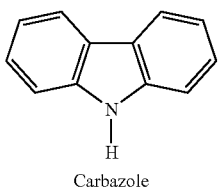
Carbazole

The concentration of the quenching agent in the total reaction mixture may be in the range from about 0.0001 moles per liter to about 2.0 moles per liter. Preferably the concentration of the quenching agent is in the range from about 0.001 moles per liter to about 1.0 moles per liter. More preferably the concentration of the quenching agent is in the range from about 0.005 moles per liter to about 0.5 moles per liter.

Terminators

Any soluble alcohol may be used to terminate the polymerization reaction in the present invention. Preferred are monoalcohols containing from about one carbon atom to about 8 carbon atoms.

EXAMPLES

Example 1

Preparation of Polyisobutylene Using a Mono-Functional Initiator and 2,5-dimethylpyrrole A four-neck 250 milliliter round-bottom flask, equipped with an overhead mechanical stirrer and platinum resistance thermometer, was fitted to the end of an ATR-FTIR probe, which is connected an FTIR spectrometer via a light conduit as described in Storey, R. F.; Thomas, Q. A. *Macromolecules*, 2003, 36, 5065-5071. This assembly was immersed into a heptane bath at –60° C. under dry nitrogen gas in a substantially inert atmosphere MBraun glovebox. An air background spectrum was acquired and subtracted from all subsequently collected spectra. The flask was then charged with the following reactants:

85 milliliters hexane equilibrated at –60° C.,
57 milliliters methyl chloride equilibrated at –60° C.,
0.357 milliliters 2-chloro-2,4,4-trimethylpentane equilibrated at room temperature, and
0.175 milliliters 2,6-dimethylpyridine equilibrated at room temperature.

The contents of the round-bottom flask were equilibrated and Fourier Transform Infrared spectroscopy (FTIR) data were continuously acquired for roughly 10 minutes to establish a reference absorbance at 887 $cm^{-1}$ prior to addition of 6.1 milliliters isobutylene equilibrated at –60° C.

With continued stirring, next 1.37 milliliters titanium tetrachloride was charged to the flask. The reaction was allowed to proceed to high conversion, approximately 95 percent, as determined by in situ FTIR monitoring of the 887 $cm^{-1}$ peak of isobutylene. The procedure used for the Fourier Transform Infrared spectroscopy monitoring is given below. A prequench aliquot, approximately 5-10 milliliter, was removed from the flask using a glass pipette and charged into a scintillation vial containing 4 milliliters anhydrous methanol equilibrated at –60° C. to terminate the polymerization reaction. The aliquot was used to determine a baseline for the quenching reaction with 2,5-dimethylpyrrole and to provide a reference for structural and molecular weight characterization in the absence of a quenching agent.

The polymerization reaction in the round-bottom flask was quenched by the addition of 0.3 milliliters 2,5-dimethylpyrrole at an isobutylene conversion of 99 percent. Post-quench aliquots, approximately 5-10 milliliters, were terminated at various time intervals after the addition of the 2,5-dimethylpyrrole by being placed in scintillation vials containing 4 milliliters anhydrous methanol equilibrated at –60° C.

The round-bottom flask was next charged with an appropriate amount methanol equilibrated at –60° C. to terminate the remaining polymerization reaction mixture at 91.9 minutes after the addition of the 2,5-dimethylpyrrole.

The aliquot samples and the final terminated reaction mixture were allowed to warm to room temperature, which allowed the volatile components to evaporate. To each aliquot sample 1-2 milliliter hexane was added and the polymer was precipitated in methanol. Polyisobutylene was recovered in each aliquot sample and agitated using a vortex mixer with fresh methanol to remove any remaining contaminants and the methanol was decanted. Polyisobutylene samples recovered in each aliquot were placed in a vacuum oven at room temperature for at least 24 hours to remove any remaining solvents.

Table I below summarizes the reactant quantities used in Examples 1-20 and Comparative Examples A-D.

Table II below summarizes the molarity of the reactants used in Examples 1-20 and Comparative Examples A-D.

The following abbreviations are used for the reactants in Tables I and II below:

TMPCI is an abbreviation of 2-chloro-2,4,4-trimethylpentane.
bDCC is an abbreviation of 1,3-di(2-chloro-2-propyl)-5-tert-butylbenzene.
25DMPy is an abbreviation of 2,5-dimethylpyrrole.
2345TeMPy is an abbreviation of 2,3,4,5-tetramethylpyrrole.
2MIn is an abbreviation of 2-methylindole.
23DMIn is an abbreviation of 2,3-dimethylindole.
125TMPy is an abbreviation of 1,2,5-trimethylpyrrole.
1MPy is an abbreviation of 1-methylpyrrole.
24DMPy is an abbreviation of 2,4-dimethylpyrrole.
2,5-DMPy/$TiCl_4$ is an abbreviation for the mixture of 2,5-dimethylpyrrole and titanium tetrachloride.

The diluent used in Examples 1-20 and Comparative Examples A-E was a mixture of hexane and methyl chloride in a volume ratio of 60:40.

Below are given descriptions of superscripts "a-h" used in Tables I and II below:

a. These quenching agents are solids at room temperature. They were first dissolved in approximately 10 milliliters pre-chilled MeCl, and the resulting solution was charged to the reaction medium. The volume of solvent used to dissolve the quenching agent is not included in total reaction volume.
b. In these reactions, the 2,6-dimethylpyridine is replaced by the common ion salt, tetra-n-butylammonium salt, and the masses in these cells indicate the specific amount used. The salt was first dissolved in approximately 10 milliliters pre-chilled methyl chloride and the resulting solution was charged to the reaction medium.
c. In these reactions, the reactor was a 60 milliliter tube.
d. Numbers in parentheses are final concentrations after polymerization reaction and pre-reacted quencher/TiCl$_4$ were combined.
e. Final conditions after polymerization reaction and pre-reacted quencher/TiCl$_4$ were combined.
f. Pre-reacted with 1.062 g of TiCl$_4$ and 0.0475 liter diluent for 25 minutes prior to addition to the polymerization reactor
g. Final volume after polymerization reaction and pre-reacted quencher/TiCl$_4$ were combined.
h. In these reactions, the 2,6-dimethylpyridine is replaced by the common ion salt, tetra-n-butylammonium salt, and the molarity in these cells indicate the concentration used. The salt was first dissolved in approximately 10 milliliters pre-chilled methyl chloride and the resulting solution was charged to the reaction medium.

TABLE I

| Example | Initiator | Initiator (grams) | 2,6-Dimethyl pyridine (grams) | Isobutylene (grams) | Titanium Tetrachloride (grams) | Quenching Agent | Quenching Agent (grams) | Total Reaction Volume (liters) | Total Diluent Volume (liters) | Temperature (° C.) |
|---|---|---|---|---|---|---|---|---|---|---|
| 1 | TMPCI | 0.3122 | 0.1607 | 4.2083 | 2.3616 | 25DMPy | 0.2797 | 0.150 | 0.142 | −60 |
| 2 | TMPCI | 0.8326 | 0.4286 | 11.2220 | 6.2977 | 25DMPy | 0.7460 | 0.400 | 0.379 | −50 |
| 3 | TMPCI | 0.4163 | 0.2143 | 5.6110 | 3.1489 | 25DMPy | 0.3730 | 0.200 | 0.189 | −40 |
| 4 | bDCC | 0.4726 | 0.3751 | 9.8193 | 5.5105 | 25DMPy | 0.4383 | 0.350 | 0.332 | −60 |
| 5 | bDCC | 3.5920 | 1.8110 | 47.4130 | 26.6078 | 25DMPy | 3.3318 | 1.690 | 1.604 | −60 |
| 6 | bDCC | 7.1715 | 1.7038 | 44.6075 | 25.0334 | 25DMPy | 6.6506 | 1.590 | 1.509 | −60 |
| 7 | bDCC | 0.9021 | 0.2143 | 5.6110 | 6.2977 | 25DMPy | 0.8366 | 0.200 | 0.188 | −60 |
| 8 | bDCC | 0.9021 | 0.2143 | 5.6110 | 11.0210 | 25DMPy | 0.8366 | 0.200 | 0.185 | −50 |
| 9 | TMPCI | 0.3122 | 0.1607 | 4.2083 | 2.3616 | 25DMPy | 0.5595 | 0.150 | 0.142 | −60 |
| 10 | TMPCI | 0.4163 | 0.2143 | 5.6110 | 6.4495 | 25DMPy | 0.7460 | 0.200 | 0.187 | −60 |
| 11 | TMPCI | 0.8326 | 0.4286 | 11.2220 | 6.2977 | 25DMPy | 0.7460 | 0.400 | 0.379 | −60 |
| 12 | TMPCI | 0.4163 | 0.2143 | 5.6110 | 3.1489 | 2345TeMPy[a] | 0.4782 | 0.200 | 0.189 | −60 |
| 13 | TMPCI | 0.4163 | 0.2143 | 5.6110 | 3.1489 | 23DMIn[a] | 0.5692 | 0.200 | 0.189 | −60 |
| 14 | TMPCI | 0.4163 | 0.2143 | 5.6110 | 3.1489 | 25DMPy | 0.1332 | 0.200 | 0.189 | −60 |
| 15[b] | TMPCI | 0.4163 | 0.2779 | 5.6110 | 3.1489 | 25DMPy | 0.1332 | 0.200 | 0.189 | −60 |
| 16[b] | TMPCI | 0.4163 | 0.2779 | 5.6110 | 3.1489 | 25DMPy | 0.3761 | 0.200 | 0.189 | −60 |
| 17 | TMPCI | 0.3122 | 0.1607 | 4.2083 | 2.3616 | 25DMPy | 0.2797 | 0.150 | 0.142 | −70 |
| 18[c] | TMPCI | 0.0416 | 0.0214 | 1.1222 | 0.3149 | Carbazole | 0.094 | 0.02 | 0.018 | −60 |
| 19 | TMPCI | 0.417 | 0.214 | 5.611 | 3.149[e] | 25DMPy/TiCl$_4$ | 0.534[f] | 0.201[g] | 0.19 | −60 |
| 20 | TMPCI | 0.4163 | 0.2143 | 5.6110 | 3.1489 | 2MIn[a] | 0.5142 | 0.200 | 0.189 | −60 |
| A[c] | TMPCI | 0.083 | 0.043 | 1.122 | 0.630 | Pyrrole | 0.040 | 0.040 | 0.038 | −70 |
| B[c] | TMPCI | 0.083 | 0.043 | 1.122 | 0.630 | 1MPy | 0.049 | 0.040 | 0.038 | −70 |
| C[c] | TMPCI | 0.083 | 0.043 | 1.122 | 0.630 | 24DMPy | 0.057 | 0.040 | 0.038 | −70 |
| D | TMPCI | 0.4163 | 0.2143 | 5.6110 | 3.1489 | 125TMPy | 0.4279 | 0.200 | 0.189 | −60 |

TABLE II

| Example | Initiator Type | Initiator (moles per liter) | 2,6-Dimethyl pyridine (moles per liter) | Isobutylene (moles per liter) | Titanium Tetrachloride (moles per liter) | Quenching Agent Type | Quenching Agent (moles per liter) | Total Reaction Volume (liters) | Total Diluent Volume (liters) | Temperature (° C.) |
|---|---|---|---|---|---|---|---|---|---|---|
| 1 | TMPCI | 0.014 | 0.010 | 0.500 | 0.083 | 25DMPy | 0.0196 | 0.150 | 0.142 | −60 |
| 2 | TMPCI | 0.014 | 0.010 | 0.500 | 0.083 | 25DMPy | 0.0196 | 0.400 | 0.379 | −50 |
| 3 | TMPCI | 0.014 | 0.010 | 0.500 | 0.083 | 25DMPy | 0.0196 | 0.200 | 0.189 | −40 |
| 4 | bDCC | 0.0047 | 0.010 | 0.500 | 0.083 | 25DMPy | 0.0132 | 0.350 | 0.332 | −60 |
| 5 | bDCC | 0.0074 | 0.010 | 0.500 | 0.083 | 25DMPy | 0.0207 | 1.690 | 1.604 | −60 |
| 6 | bDCC | 0.0157 | 0.010 | 0.500 | 0.083 | 25DMPy | 0.0440 | 1.590 | 1.509 | −60 |
| 7 | bDCC | 0.0157 | 0.010 | 0.500 | 0.166 | 25DMPy | 0.0440 | 0.200 | 0.188 | −60 |
| 8 | bDCC | 0.0157 | 0.010 | 0.500 | 0.291 | 25DMPy | 0.0440 | 0.200 | 0.185 | −50 |
| 9 | TMPCI | 0.014 | 0.010 | 0.500 | 0.083 | 25DMPy | 0.0392 | 0.150 | 0.142 | −60 |
| 10 | TMPCI | 0.014 | 0.010 | 0.500 | 0.170 | 25DMPy | 0.0392 | 0.200 | 0.187 | −60 |
| 11 | TMPCI | 0.014 | 0.010 | 0.500 | 0.083 | 25DMPy | 0.0196 | 0.400 | 0.379 | −60 |
| 12 | TMPCI | 0.014 | 0.010 | 0.500 | 0.083 | 2345TeMPy[a] | 0.0196 | 0.200 | 0.189 | −60 |
| 13 | TMPCI | 0.014 | 0.010 | 0.500 | 0.083 | 23DMIn[a] | 0.0196 | 0.200 | 0.189 | −60 |
| 14 | TMPCI | 0.014 | 0.010 | 0.500 | 0.083 | 25DMPy | 0.007 | 0.200 | 0.189 | −60 |
| 15[h] | TMPCI | 0.014 | 0.005 | 0.500 | 0.083 | 25DMPy | 0.007 | 0.200 | 0.189 | −60 |
| 16[h] | TMPCI | 0.014 | 0.005 | 0.500 | 0.083 | 25DMPy | 0.0196 | 0.200 | 0.189 | −60 |
| 17 | TMPCI | 0.014 | 0.010 | 0.500 | 0.083 | 25DMPy | 0.0196 | 0.150 | 0.142 | −70 |

TABLE II-continued

| Example | Initiator Type | Initiator (moles per liter) | 2,6-Dimethyl pyridine (moles per liter) | Isobutylene (moles per liter) | Titanium Tetrachloride (moles per liter) | Quenching Agent Type | Quenching Agent (moles per liter) | Total Reaction Volume (liters) | Total Diluent Volume (liters) | Temperature (° C.) |
|---|---|---|---|---|---|---|---|---|---|---|
| 18[c] | TMPCI | 0.014 | 0.01 | 1.00 | 0.083 | Carbazole | 0.028 | 0.02 | 0.018 | −60 |
| 19 | TMPCI | 0.018 (0.014)[d] | 0.013 (0.01)[d] | 0.655 (0.5)[d] | 0.072 (0.083)[d] | 25DMPy/TiCl$_4$ | 0.028[e] | 0.201[g] | 0.19 | −60 |
| 20 | TMPCI | 0.014 | 0.010 | 0.500 | 0.083 | 2MIn[a] | 0.0196 | 0.200 | 0.189 | −60 |
| A[c] | TMPCI | 0.014 | 0.010 | 0.500 | 0.083 | Pyrrole | 0.015 | 0.040 | 0.038 | −70 |
| B[c] | TMPCI | 0.014 | 0.010 | 0.500 | 0.083 | 1MPy | 0.015 | 0.040 | 0.038 | −70 |
| C[c] | TMPCI | 0.014 | 0.010 | 0.500 | 0.083 | 24DMPy | 0.015 | 0.040 | 0.038 | −70 |
| D | TMPCI | 0.014 | 0.010 | 0.500 | 0.083 | 125TMPy | 0.0196 | 0.200 | 0.189 | −60 |

Polyisobutylene samples were analyzed using $^1$H NMR and GPC as described below.

Procedure for Fourier Transform Infrared Spectroscopy Monitoring of Isobutylene The polymerization reaction was followed by Fourier Transform Infrared spectroscopy monitoring of isobutylene peak at 887 cm$^{-1}$. This procedure is described in Storey, R. F.; Thomas, Q. A. *Macromolecules*, 2003, 36, 5065-5071.

Procedure for Collecting $^1$H NMR Data $^1$H NMR spectra were collected using a BrukerAC-300 (300 MHz) spectrophotometer using samples concentrations of 3 percent to 5 percent (weight/weight) in CDCl$_3$. $^1$H NMR spectra were used for analysis of the end groups. Fractions of exo-olefin, endo-olefin, tert-chloride and coupled olefin chain ends were obtained using $^1$H NMR integration as described in the following section.

Procedure for Collecting GPC Data

GPC data were used to determine number average molecular weight ($M_n$), weight average molecular weight ($M_w$) and Polydispersity index (PDI), i.e., $M_w/M_n$. GPC was also used to qualitatively detect olefin coupled product.

Procedure for Calculating the Fractional Amounts of Chain Ends on the Polyisobutylene Product The fractions of exo-olefin, endo-olefin, and tert-chloride chain ends, and EAS, di-EAS, and coupled products in the polyisobutylene samples were quantified using $^1$H NMR integration. It was assumed that these six species represent 100 percent of the chain ends. In some instances, EAS, di-EAS, and coupled products were deemed to be absent by qualitative inspection of the $^1$H NMR spectrum, and for di-EAS and coupled products, by confirming the absence of a shoulder on the low elution volume side of the main polymer peak in the GPC chromatogram. Two procedures are given below. The "General Procedure" was used when coupled product was detected; the "Special Procedure" was used when coupled product was deemed to be absent.

General Procedure

The fractional molar amount of each type of chain end was obtained using an equation analogous to the equation given below for determining the fractional amount of exo-olefin, $$F(exo) = (A_{exo})/(A_{exo} + A_{endo} + A_{tert-Cl} + A_{EAS} + 2A_{di-EAS} + 2A_{coupled}) \quad (1)$$

where $A_{endo}$ is the area of the single olefinic resonance at 5.15 ppm, $A_{exo}$ is the area of the exo-olefinic resonance 4.63 ppm, and $A_{tert-Cl}$ was calculated as follows:

$$A_{tert-Cl} = (A_{1.65-1.72}/6) - A_{endo} \quad (2)$$

where $A_{1.65-1.72}$ is the integrated area of the convoluted peaks associated with the gem-dimethyl protons of the endo-olefin and the tert-chloride chain ends. The integrated area of EAS or di-EAS product, when present, was evaluated on a situation-by-situation basis; the integration was determined based on a peak that is not convoluted by other peaks, and the area was normalized based on the number of protons that have that characteristic peak. It will be noted that a co-efficient of 2 appears in equation (1) for both di-EAS and coupled product, to account for the fact that creation of either of these products consumes 2 polyisobutylene chains. $A_{coupled}$ was calculated as follows:

$$A_{coupled} = (A_{5.0-4.75} - A_{4.5-4.75})/2 \quad (3)$$

where $A_{5.0-4.75}$ is the integrated area of the convoluted peaks associated with one of the exo-olefin protons and the two identical protons of the coupled product, and where $A_{4.5-4.75}$ is the integrated area of the peak associated with the other exo-olefin proton.

Special Procedure

In the qualitative absence of coupled product, the fractional molar amount of each type of chain end was obtained using an equation analogous to the equation given below for determining the fractional amount of exo-olefin, $$F(exo) = (A_{exo})/(A_{exo} + A_{endo} + A_{tert-Cl} + A_{EAS} + 2A_{di-EAS}) \quad (1)$$

where $A_{endo}$ is the area of the single olefinic resonance at 5.15 ppm, $A_{exo}$ is the average area of the two exo-olefinic resonances at 4.63 and 4.85 parts per million, and $A_{tert-Cl}$, $A_{EAS}$, and $A_{di-EAS}$ were calculated in the same manner as described in the "General Procedure".

The $^1$H NMR results obtained on the polyisobutylene samples prepared in Example 1 above are given below in Table III as the mole percent of the total end groups.

TABLE III

| Quench Time (minutes after the addition of 2,5-dimethyl pyrrole) | | | | | |
|---|---|---|---|---|---|
| Pre-quench | 15.9 | 30.9 | 45.3 | 61.3 | 75.3 |
| Exo-olefin yield (mole %) | | | | | |
| 8 | 99 | 100 | 100 | 100 | 100 |

The data in Table III shows that near quantitative conversion of chain ends to exo-olefin was achieved within 15.9 minutes after the addition of the 2,5-dimethylpyrrole.

Example 2

Preparation of Polyisobutylene Using a
Mono-Functional Initiator and 2,5-dimethylpyrrole Polyisobutylene was prepared as described in Example 1 and the conditions listed in Table 1 above. Example 2 conditions were identical to those used in Example 1 above except the temperature was 10° C. warmer and the reaction volume was increased from 150 milliliters to 400 milliliters.

The polyisobutylene samples were collected and analyzed as described above for the Example 1 polyisobutylene samples.

The $^1$H NMR results obtained on the polyisobutylene samples prepared in Example 2 above are given below in Table IV as the mole percent of the total end groups.

TABLE IV

| Pre-quench (minutes) | Quench Time (minutes after the addition of 2,5-dimethyl pyrrole) | | |
|---|---|---|---|
| 0 | 10 | 15 | 60 |
| | Exo-olefin yield (mole %) | | |
| 18 | 100 | 100 | 100 |

Example 3

Preparation of Polyisobutylene Using a
Mono-Functional Initiator and
2,5-dimethylpyrrole—Reaction Temperature –40° C.

Polyisobutylene was prepared according to the procedure of Example 1 using the conditions listed in Table 1. Example 3 conditions are identical to Example 1 conditions except that the temperature was –40° C., and the total volume of the reaction was 200 milliliters instead of 150 milliliters.

The polyisobutylene samples were collected and analyzed as described above for the Example 1 polyisobutylene samples.

The results, shown in Table V, demonstrated that 2,5-dimethylpyrrole quenching produced exo-olefin at 40° C. without coupling; however, the overall reaction was slower and additional time was allowed for complete quenching to occur.

Example 4

Preparation of Polyisobutylene Using a
Di-Functional Initiator and
2,5-dimethylpyrrole—Target Molecular Weight
6,000 Grams Per Mole Polyisobutylene was prepared using the procedure described in Example 1 and the conditions listed in Table 1. Example 4 conditions were similar to Example 1 conditions except that the mono-functional initiator, 2-chloro-2,4,4-trimethylpentane was replaced with a di-functional initiator, 1,3-di(2-chloro-2-propyl)-5-tert-butylbenzene and that the reaction volume was increased from 150 milliliters to 350 milliliters. All conditions are given in Table I.

The polyisobutylene samples were collected and analyzed as described above for the Example 1 polyisobutylene samples.

The $^1$H NMR data were used to calculate the exo-olefin as the mole percent of the total chain ends in the polyisobutylene samples prepared in Example 4 above.

Example 5

Large Scale Preparation of Polyisobutylene Using a
Di-Functional Initiator and
2,5-dimethylpyrrole—Target Molecular Weight
4,000 Grams Per Mole Polyisobutylene was prepared using the procedure described in Example 4 and the conditions listed in Table 1. Example 5 conditions are identical to Example 4 conditions except that the initiator concentration and quenching agent concentration were increased. The reactor volume was increased and the target molecular weight was decreased to 4,000 g/mol.

The polyisobutylene samples were collected and analyzed as described above for Example 1 polyisobutylene samples.

The $^1$H NMR data were used to calculate the exo-olefin as the mole percent of the total chain ends in the polyisobutylene samples prepared in Example 5 above.

Example 6

Large Scale Preparation of Polyisobutylene Using a
Di-Functional Initiator and
2,5-dimethylpyrrole—Target Molecular Weight
2,000 Grams Per Mole Polyisobutylene was prepared as described in Example 5 above, except the initiator concentration and quenching agent concentration were increased; exact conditions are given in Table I.

The polyisobutylene samples were collected and analyzed as described above for the Example 1 polyisobutylene samples.

The $^1$H NMR data were used to calculate the exo-olefin as the mole percent of the total chain ends in the polyisobutylene samples prepared in Example 6 above.

The results, shown in Table V, demonstrated that increasing the chain end concentration and quenching agent concentration without a corresponding increase in the Lewis acid concentration caused retardation in the rate of exo-olefin formation.

Example 7

Effect of Titanium Tetrachloride Concentration on
Preparation of Polyisobutylene Target Molecular Weight 2,000 Grams Per Mole Polyisobutylene was prepared as in Example 6 above, except the concentration of titanium tetrachloride was increased; exact conditions are given in Table I.

The polyisobutylene samples were collected and analyzed as described above for the Example 1 polyisobutylene samples.

The $^1$H NMR data were used to calculate the exo-olefin as the percent of the total chain ends in the polyisobutylene samples prepared in Example 7 above.

The results, shown in Table V, demonstrated that doubling the Lewis acid concentration increased the rate of exo-olefin formation but coupling occurred due to the high chain end concentration.

Example 8

Effect of Titanium Tetrachloride Concentration and Temperature on Preparation of Polyisobutylene Polyisobutylene was prepared according to the procedure of Example 7 using the conditions listed in Table 1. Example 8 conditions are identical to Example 7 conditions except that the concentration of titanium tetrachloride was doubled and the temperature was raised to −50° C.

The polyisobutylene samples were collected and analyzed as described above for the Example 1 polyisobutylene samples.

The $^1$H NMR data were used to calculate the exo-olefin as the percent of the total chain ends in the polyisobutylene samples prepared in Example 8 above.

The results, shown in Table V, demonstrated that increasing the Lewis acid concentration and the temperature reduced the rate of coupling relative to exo-olefin formation.

Example 9

Preparation of Polyisobutylene Using a Mono-Functional Initiator and 2,5-dimethylpyrrole—Effect of Doubling Quenching Agent Concentration with All Other Conditions Held Constant Polyisobutylene was prepared according to the procedure of Example 1 using the conditions listed in Table 1. Example 9 conditions are identical to Example 1 conditions except that the concentration of 2,5-dimethylpyrrole was doubled.

The polyisobutylene samples were collected and analyzed as described above for the Example 1 polyisobutylene samples.

The $^1$H NMR data were used to calculate the exo-olefin as the percent of the total chain ends in the polyisobutylene samples prepared in Example 9 above. The results, shown in Table V, demonstrated that increasing the quenching agent concentration without a corresponding increase in the Lewis acid concentration, caused retardation of the rate of exo-olefin formation.

Example 10

Preparation of Polyisobutylene Using a Mono-Functional Initiator and 2,5-dimethylpyrrole—Effect of Doubling Quenching Agent Concentration and Doubling Lewis Acid Concentration with All Other Conditions Held Constant Polyisobutylene was prepared according to the procedure of Example 1 using the conditions listed in Table 1. Example 10 conditions are identical to Example 1 conditions except that the concentration of 2,5-dimethylpyrrole was doubled and the concentration of titanium tetrachloride was doubled.

The polyisobutylene samples were collected and analyzed as described above for the Example 1 polyisobutylene samples.

The $^1$H NMR data were used to calculate the exo-olefin as the percent of the total chain ends in the polyisobutylene samples prepared in Example 10 above. The results, shown in Table V, demonstrated that an increase in the quenching agent concentration must be accompanied by a corresponding increase in the Lewis acid concentration to maintain an acceptable rate of exo-olefin formation.

Example 11

Preparation of Polyisobutylene Using a Mono-Functional Initiator and 2,5-dimethylpyrrole—Effect of Reaction Scale Polyisobutylene was prepared according to the procedure of Example 1 using the conditions listed in Table 1. Example 11 conditions are identical to Example 1 conditions except that the scale (total reaction volume) of Example 10 is approximately 3 times that of Example 1.

The polyisobutylene samples were collected and analyzed as described above for the Example 1 polyisobutylene samples.

The $^1$H NMR data were used to calculate the exo-olefin as the percent of the total chain ends in the polyisobutylene samples prepared in Example 11 above. The results, shown in Table V, demonstrated that the scale of the reaction essentially had no effect upon the results.

Example 12

Preparation of Polyisobutylene Using a Mono-Functional Initiator and 2,3,4,5-tetramethylpyrrole Polyisobutylene was prepared using the conditions listed in Table 1, according to the procedure of Example 1, except that 2,3,4,5-tetramethyl pyrrole, a solid at room temperature, was added as a pre-chilled methyl chloride solution. Example 12 conditions are similar to Example 1 conditions except for identity of the quenching agent, its mode of introduction to the reactor and the scale of the reaction.

The polyisobutylene samples were collected and analyzed as described above for the Example 1 polyisobutylene samples.

The $^1$H NMR data were used to calculate the exo-olefin as the percent of the total chain ends in the polyisobutylene samples prepared in Example 12 above. This example illustrated a preferred embodiment of the invention. The results, shown in Table V, demonstrated that 2,3,4,5-tetramethylpyrrole is virtually identical in effectiveness compared to 2,5-dimethylpyrrole.

Example 13

Preparation of Polyisobutylene Using a Mono-Functional Initiator and 2,3-dimethylindole Polyisobutylene was prepared using the conditions listed in Table 1, according to the procedure of Example 1, except that 2,3-dimethylindole, a solid at room temperature, was added as a pre-chilled methyl chloride solution. Example 13 conditions were similar to Example 12 conditions except for identity of the quenching agent.

The polyisobutylene samples were collected and analyzed as described above for the Example 1 polyisobutylene samples.

The ¹H NMR data were used to calculate the exo-olefin as the percent of the total chain ends in the polyisobutylene samples prepared in Example 13.

Example 14

Preparation of Polyisobutylene Using a Mono-Functional Initiator and 2,5-dimethylpyrrole—The Molar Ratio of Quenching Agent to Chain End 0.5 to 1.0

Polyisobutylene was prepared according to the procedure of Example 1 using the conditions listed in Table 1. Example 19 conditions are identical to Example 1 conditions except that the molar ratio of quenching agent to chain end was 0.5 to 1.0 instead of 1.4 to 1.0 and the total reaction volume was 200 milliliters instead of 150 milliliters.

The polyisobutylene samples were collected and analyzed as described above for the Example 1 polyisobutylene samples.

The results, shown in Table V, demonstrated that the moles of exo-olefin produced exceeded the moles of 2,5-dimethylpyrrole charged to the reaction. Without being bound by any theory, it is believed that 2,5-dimethylpyrrole removed a proton from the carbenium ion and subsequently transferred the proton to the electron donor. The quenching agent was serving as a catalyst for elimination, and the electron donor was serving as a proton acceptor.

Example 15

Preparation of Polyisobutylene Using a Mono-Functional Initiator and 2,5-dimethylpyrrole—Molar Ratio of Quenching Agent to Chain End 0.5 to 1.0 and Electron Donor Replaced by Common Ion Salt Precursor Polyisobutylene was prepared according to the procedure of Example 1 using the conditions listed in Table 1. Example 15 conditions were identical to Example 14 conditions except that the electron donor was replaced by a common ion salt precursor.

The polyisobutylene samples were collected and analyzed as described above for the Example 1 polyisobutylene samples.

The results, summarized in Table V, demonstrated that in the absence of an electron donor, the quenching agent served both as catalyst and proton acceptor. They also showed that the reaction of the quenching agent with the chains ends was quantitative since the yield of 32 percent exo-olefin plus the yield of 34 percent coupled product indicated that a total of 49 percent of the chains underwent elimination by the quenching agent. A high coupling fraction occurred because depletion of the quenching agent caused the rate of elimination to diminish dramatically relative to the rate of coupling. The results suggest that complete conversion of the chain ends to exo-olefin, in the absence of a basic electron donor, required a stoichiometric or higher concentration of quenching agent.

Example 16

Preparation of Polyisobutylene Using a Mono-Functional Initiator and 2,5-dimethylpyrrole—Molar Ratio of Quenching Agent to Chain End 1.4 to 1.0 and Electron Donor replaced by Common Ion Salt Precursor Polyisobutylene was prepared according to the procedure of Example 1 using the conditions listed in Table 1. Example 16 conditions were identical to Example 15 conditions except that the molar ratio of quenching agent to chain end was 1.4 to 1.0 instead of 0.5 to 1.0.

The polyisobutylene samples were collected and analyzed as described above for the Example 1 polyisobutylene samples.

The results, shown in Table V, further demonstrated that in the absence of an electron donor, the quenching agent served both as catalyst and proton acceptor. Conversion to exo-olefin was more nearly complete and coupling was considerably reduced because an excess of quenching agent was used.

Example 17

Preparation of Polyisobutylene Using a Mono-Functional Initiator and 2,5-dimethylpyrrole—Reaction Temperature Equals −70° C.

Polyisobutylene was prepared according to the procedure of Example 1 using the conditions listed in Table 1. Example 17 conditions are identical to Example 1 conditions except that the temperature was −70° C. instead of −60° C.

The polyisobutylene samples were collected and analyzed as described above for the Example 1 polyisobutylene samples.

The results, shown in Table V, demonstrated that lower temperatures, particularly −70° C. and lower, undesirably promoted coupling.

Example 18

Preparation of Polyisobutylene Using a Mono-Functional Initiator and Carbazole

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

108 milliliters hexane equilibrated at −60° C.,
72 milliliters methylchloride equilibrated at −60° C.,
0.48 milliliters 2-chloro-2,4,4-trimethylpentane equilibrated at room temperature,
0.23 milliliters 2,6-dimethylpyridine equilibrated at room temperature,
16.4 milliliters of isobutylene equilibrated at −60° C., and The contents of the round-bottom flask were equilibrated at −60° C.

With continued stirring, next 1.82 milliliters titanium tetrachloride was charged to the flask. The reaction was allowed to proceed 12 minutes and then 20 milliliters of the polymerization solution was charged to four 60 milliliter test tubes, equipped with threaded caps.

The polymerization was allowed to continue in each test tube for 4 additional minutes (16 total reaction minutes) at which point 1 of the 4 tubes was terminated with 5 milliliters of methanol to provide a comparative example prior to addition of quenching agents. The remaining 3 solutions were allowed to continue reacting for 8 minutes with intermittent shaking (24 total reaction minutes), at which time 0.094 g carbazole was added to one of the test tubes containing a reactive polymerization. After addition of carbazole, 1 of the remaining polymerizations was terminated with 5 milliliters of methanol to provide another comparative example. The carbazole quenching reaction was allowed to proceed 15 minutes at which time 5 milliliters of methanol was charged in order to terminate the reaction. The final polymerization test tube was then terminated with 5 milliliters of methanol to provide a final comparative example. Non-quencher-containing reactions were used to provide a comparative baseline for the quenching reactions and to provide references for structural and molecular weight characterization in the absence of a quenching agent.

Example 19

Preparation of Polyisobutylene Using a Mono-Functional Initiator and 2,5-dimethylpyrrole—Pre-Reaction of 2,5-dimethylpyrrole with Titanium Tetrachloride Prior to Quenching The reactor configuration, ATR-FTIR probe and conduit, FTIR spectrometer and spectroscopic method and analysis, constant-temperature heptane bath, and glovebox were the same as described in Example 1. The 250 milliliter reactor flask was charged with the following reactants:
85.5 milliliters hexane equilibrated at −60° C.,
57 milliliters methyl chloride equilibrated at −60° C.,
0.23 milliliters 2,6-dimethylpyridine equilibrated at room temperature, and
0.48 milliliters 2-chloro-2,4,4-trimethyl pentane equilibrated at room temperature.

A reference absorbance at 887 cm$^{-1}$ was established and then 8.18 milliliters isobutylene equilibrated at −60° C. was charged to the 250 milliliter reactor flask.

A separate 2-neck 500 milliliter flask was charged with the following reactants:
28.5 milliliters hexane equilibrated at −60° C.,
19 milliliters methyl chloride equilibrated at −60° C., and
0.57 milliliters 2,5-dimethylpyrrole equilibrated at room temperature.

Both flasks were equilibrated in the −60° C. heptane bath.

Next, 1.2 milliliters titanium tetrachloride was charged to the 250 milliliter reactor flask followed by the immediate of 0.62 milliliters titanium tetrachloride to the 500 milliliter flask.

After a polymerization time of 25 minutes, a pre-quench aliquot (5-10 milliliter) was removed from the contents of the 250 milliliter reactor flask and terminated with 10-15 milliliters per-chilled methanol, and then the polymerization was quenched by pouring the contents of the 500 milliliter flask into the 250 milliliter reactor flask. Aliquots were removed at 1, 3, 5, 8, 15, and 30 minutes and terminated with pre-chilled methanol. The balance of the reactor contents was terminated at 60 minutes using pre-chilled methanol.

Polyisobutylene samples were collected and analyzed as described above for the polyisobutylene samples obtained in Example 1. The data obtained are summarized below in Table V.

Example 20

Preparation of Polyisobutylene Using a Mono-Functional Initiator and 2-methylindole—Effect of Indole Substitution on the Quenching Reaction Polyisobutylene was prepared using the conditions listed in Table 1, according to the procedure of Example 1, except that 2-methylindole, a solid at room temperature, was added as a pre-chilled methyl chloride solution.

The polyisobutylene samples were collected and analyzed as described above for the Example 1 polyisobutylene samples.

The $^1$H NMR data were used to calculate the exo-olefin as the percent of the total chain ends in the polyisobutylene samples prepared in Example 20. The data show that 2-methylindole yields a small amount of exo-olefin polyisobutylene.

Comparative Examples A-C

Preparation of Polyisobutylene Using a Mono-Functional Initiator

Effect of Pyrrole Structure on the Quenching Reaction

Polyisobutylene was prepared according to the procedure of Example 18 using the conditions listed in Table 1. Comparative examples A-C conditions were similar to Example 18 conditions except that the total reaction volume was 40 milliliters, the quenching agent concentration was 0.015 M, and the 14 temperature was −70° C.

The polyisobutylene samples were collected and analyzed as described above for the Example 1 polyisobutylene samples.

The results, shown in Table V, demonstrated that the placement of alkyl substituents on the pyrrole ring had a significant influence on the structure of the product. Most notably, reactions quenched with pyrrole and 1-methyl pyrrole did not yield any exo-olefin polyisobutylene, but rather yielded EAS and di-EAS products.

Comparative Example D

Preparation of Polyisobutylene Using a Mono-Functional Initiator

Effect of Pyrrole Structure on the Quenching Reaction

Polyisobutylene was prepared according to the procedure of Example 1 using the conditions listed in Table 1. Comparative Example D conditions are very similar to Example 1 conditions except for the total volume of the reaction and the structure of the pyrrole compound.

The polyisobutylene samples were collected and analyzed as described above for the Example 1 polyisobutylene samples.

The results, shown in Table V demonstrated that 1,2,5-trimethylpyrrole was an ineffective quenching agent relative to 2,5-dimethylpyrrole at −60° C. The major product obtained with the 1,2,5-trimethylpyrrole was tert-chloride polyisobutylene.

carbon atoms to about 8 carbon atoms, and $R_1$ and $R_4$ are independently alkyl containing one carbon atom to about 20 carbon atoms; or

TABLE V

Composition of Chain Ends after 60 minutes of Quenching

| Examples | Quenching Agent | Exo-Olefin Chain End (mole %) | Endo-Olefin Chain End (mole %) | Tert-Cl Chain End (mole %) | EAS[a] Chain End (mole %) | Di-EAS Chain End (mole %) | Coupled Product (mole %) | Reaction Temp. (° C.) |
|---|---|---|---|---|---|---|---|---|
| 1 | 2,5-dimethylpyrrole | 100 | 0 | 0 | 0 | 0 | 0 | −60 |
| 2 | 2,5-dimethylpyrrole | 100[a] | 0 | 0 | 0 | 0 | 0 | −50 |
| 3 | 2,5-dimethylpyrrole | 99 | 1 | 0 | 0 | 0 | 0 | −40 |
| 4 | 2,5-dimethylpyrrole | 100 | 0 | 0 | 0 | 0 | 0 | −60 |
| 5 | 2,5-dimethylpyrrole | 100 | 0 | 0 | 0 | 0 | 0 | −60 |
| 6 | 2,5-dimethylpyrrole | 28 | 0 | 72 | 0 | 0 | 0 | −60 |
| 7 | 2,5-dimethylpyrrole | 68 | 0 | 1 | 0 | 0 | 31 | −50 |
| 8 | 2,5-dimethylpyrrole | 83 | 0 | 0 | 0 | 0 | 17 | −50 |
| 9 | 2,5-dimethylpyrrole | 27 | 0 | 73 | 0 | 0 | 0 | −60 |
| 10 | 2,5-dimethylpyrrole | 99 | 0 | 1 | 0 | 0 | 0 | −60 |
| 11 | 2,5-dimethylpyrrole | 100[a] | 0 | 0 | 0 | 0 | 0 | −60 |
| 12 | 2,3,4,5-tetramethylpyrrole | 100 | 0 | 0 | 0 | 0 | 0 | −60 |
| 13 | 2,3-dimethylindole | 90 | 2 | 3 | 5 | N/A | 0 | −60 |
| 14 | 2,5-dimethylpyrrole | 74 | 0 | 15 | 0 | 0 | 11 | −60 |
| 15 | 2,5-dimethylpyrrole | 32 | 0 | 34 | 0 | 0 | 34 | −60 |
| 16 | 2,5-dimethylpyrrole | 84 | 0 | 6 | 0 | 0 | 10 | −60 |
| 17 | 2,5-dimethylpyrrole | 65 | 0 | 7 | 0 | 0 | 28 | −70 |
| 18 | Carbazole | 23 | <1 | 70 | <4 | <1 | <3 | −60 |
| 19 | 2,5-dimethylpyrrole/TiCl$_4$ | 100 | 0 | 0 | 0 | 0 | 0 | −60 |
| 20 | 2-methylindole | 18 | 0 | 2 | 78 | N/A | 2 | −60 |
| A | Pyrrole[b] | 0 | 0 | 0 | 33 | 66 | 0 | −70 |
| B | 1-methylpyrrole | 0 | 0 | 0 | 99 | 0 | 0 | −70 |
| C | 2,4-dimethylpyrrole | 12 | 0 | 72 | 13 | 0 | 2 | −70 |
| D | 1,2,5-trimethylpyrrole | 3 | 0 | 97 | 0 | 0 | 0 | −60 |

[a]Data taken from 45 minute quench time
[b]Data taken from 30 minute quench time
N/A Data not available.

What is claimed is:

1. A method for preparing a polyolefin containing one or more exo-olefinic end groups on the polymer chain from a monomer, comprising quenching a cationic quasi-living polyolefin polymer system with one or more nitrogen-containing five-membered aromatic ring compounds selected from pyrroles and imidazoles after high conversion of the monomer has occurred, wherein the pyrroles have the formula:

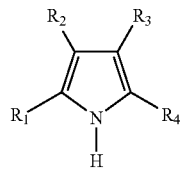

wherein:
(a) $R_1$ and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or
(b) $R_2$ and $R_3$ form a fused aromatic ring of from 6 carbon atoms to 10 carbon atoms or an aliphatic ring of from 4

(c) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms; and the imidazoles have at least two hydrocarbyl substituents attached to the aromatic ring,
provided the nitrogen containing five-membered aromatic ring is not:
(a) 2-phenylindole;
(b) 2-methylbenzimidazole;
(c) 1,2-dimethylimidazole;
(d) 2-phenylimidazole; and
(e) 2,4,5-triphenylimidazole.

2. The method of claim 1, wherein the polyolefin is prepared in situ.

3. The method of claim 1, wherein the nitrogen-containing five-membered aromatic ring compound has the formula:

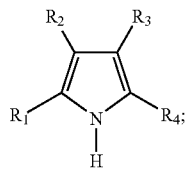

wherein:
(a) $R_1$ and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or (b) $R_2$ and $R_3$ form a fused aromatic ring of from 6 carbon atoms to 10 carbon atoms or an aliphatic ring of from 4 carbon atoms to about 8 carbon atoms, and $R_1$ and $R_4$ are independently alkyl containing one carbon atom to about 20 carbon atoms; or (c) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms.

4. The method of claim 3, wherein the pyrrole has the following formula:

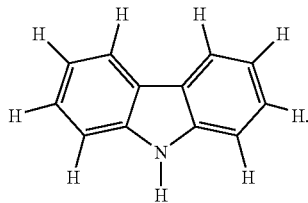

5. The method of claim 1, wherein the polyolefin is polyisobutylene.

6. The method of claim 1, wherein the quenching is carried out at a temperature in the range of from about $-130°$ C. to about $10°$ C.

7. The method of claim 6, wherein the quenching is carried out at a temperature in the range of from $-80°$ C. to about $0°$ C.

8. The method of claim 7, wherein the quenching is carried out at a temperature in the range of from $-70°$ C. to about $-10°$ C.

9. The method of claim 8, wherein the quenching is carried out at a temperature in the range of from about $-60°$ C. to about $-20°$ C.

10. The method of claim 3, wherein each alkyl group on the pyrrole ring has from one carbon atom to about 12 carbon atoms.

11. The method of claim 10, wherein each alkyl group on the pyrrole ring has from one carbon atom to about 4 carbon atoms.

12. The method of claim 1, wherein the polyolefin is prepared by quenching a quasi-living polyolefin polymer product containing terminal tert-chloride chain ends or a mixture of terminal tert-chloride chain ends and terminal olefinic chain ends in the presence of a Lewis acid.

13. The method of claim 12, wherein the quasi-living polyolefin polymer product contains terminal tert-chloride chain ends.

14. The method of claim 12, wherein the Lewis acid is a titanium or boron halide.

15. The method of claim 14, wherein the Lewis acid is a titanium halide.

16. The method of claim 15, wherein the Lewis acid is titanium tetrachloride.

17. The method of claim 1, wherein the quasi-living polyolefin polymer is formed by contacting at least one cationically polymerizable monomer with an initiator, in the presence of a Lewis acid under reaction conditions suitable for quasi-living polymerization.

18. The method of claim 17, wherein the at least one cationically polymerizable monomer comprises at least one of isobutylene, 2-methyl-1-butene, 3-methyl-1-butene, 4-methyl-1-pentene, and beta-pinene.

19. The method of claim 18, wherein the at least one cationically polymerizable monomer is isobutylene.

20. The method of claim 17, wherein two different cationically polymerizable monomers are employed.

21. The method of claim 17, wherein the initiator is multifunctional.

22. The method of claim 21, wherein the initiator is di-functional.

23. The method of claim 22, wherein the di-functional initiator comprises at least one of 1,3-di(2-chloro-2-propyl)-5-tert-butylbenzene, 1,4-di(2-chloro-2-propyl)benzene, 1,4-di(2-acetoxy-2-propyl)benzene, 1,3-di(2-acetoxy-2-propyl)-5-tert-butylbenzene, 1,3-di(2-methoxy-2-propyl)-5-tert-butylbenzene and 1,4-di(2-methoxy-2-propyl)benzene.

24. The method of claim 17, wherein the initiator is mono-functional.

25. The method of claim 24, wherein the mono-functional initiator comprises at least one of 2-chloro-2-phenylpropane; 2-acetoxy-2-phenylpropane; 2-propionoxy-2-phenylpropane, 2-methoxy-2-phenylpropane, 2-ethoxy-2-phenylpropane, 2-chloro-2,4,4-trimethylpentane, 2-acetoxy-2,4,4-trimethylpentane, 2-propionoxy-2,4,4-trimethylpentane, 2-methoxy-2,4,4-trimethylpentane, and 2-ethoxy-2,4,4-trimethylpentane.

26. The method of claim 1, wherein the nitrogen-containing five-membered aromatic ring is an imidazole having at least two hydrocarbyl substituents attached to the aromatic ring.

27. The method of claim 26, wherein the imidazole having at least two hydrocarbyl substituents attached to the aromatic ring has the general formula:

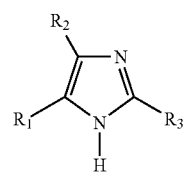

wherein $R_3$ is branched alkyl containing from about 4 carbon atoms to about 20 carbon atoms, and wherein (a) $R_1$ and $R_2$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms, wherein at least one of $R_1$ or $R_2$ is not hydrogen; or (b) $R_1$ and $R_2$ form a fused aromatic ring of from 6 carbon atoms to 10 carbon atoms or an aliphatic ring of from 4 carbon atoms to 8 carbon atoms.

28. The method of claim 27, wherein $R_1$ is methyl, $R_2$ is hydrogen and $R_3$ is tert-butyl.

29. The method of claim 1, wherein the molecular weight distribution, $M_w/M_n$, of the polyolefin polymer is present in the range of about 1.01 to about 3.0.

30. The method of claim 29, wherein the molecular weight distribution, $M_w/M_n$, of the polyolefin polymer is present in the range of about 1.1 to about 2.0.

31. The method of claim 30, wherein the molecular weight distribution, $M_w/M_n$, of the polyolefin polymer is less than 1.5.

32. The method of claim 3, wherein the pyrrole is 2,3-dimethylindole.

33. The method of claim 1, wherein the polyolefin has at least 20 percent exo-olefin end groups.

34. The method of claim 1, wherein the polyolefin has at least 50 percent exo-olefin end groups.

35. The method of claim 1, wherein the polyolefin has at least 70 percent exo-olefin end groups.

36. A method for preparing a polyolefin containing one or more exo-olefinic end groups on the polymer chain from a monomer, comprising quenching a cationic quasi-living polyolefin polymer system with one or more nitrogen-containing five-membered aromatic ring compounds selected from pyrroles and imidazoles after high conversion of the monomer has occurred, wherein the pyrroles have the formula:

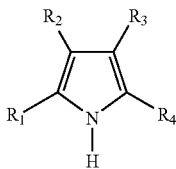

wherein:
(a) $R_1$ and $R_2$ form a fused aromatic ring of from 6 carbon atoms to 10 carbon atoms or an aliphatic ring of from 4 carbon atoms to about 8 carbon atoms, $R_4$ is alkyl containing one carbon atom to about 20 carbon atoms, and $R_3$ is hydrogen or alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or (b) $R_2$ and $R_3$ form a fused aromatic ring of from 6 carbon atoms to 10 carbon atoms or an aliphatic ring of from 4 carbon atoms to about 8 carbon atoms, and $R_1$ and $R_4$ are independently alkyl containing one carbon atom to about 20 carbon atoms; or (c) both $R_1$ and $R_2$, and $R_3$ and $R_4$, taken in pairs, independently form a fused aromatic ring of from 6 carbon atoms to 10 carbon atoms or an aliphatic ring of from 4 carbon atoms to about 8 carbon atoms; and the imidazoles have at least two hydrocarbyl substituents attached to the aromatic ring, wherein the nitrogen containing five-membered aromatic ring compounds are pre-reacted with a Lewis acid, and provided the nitrogen containing five-membered aromatic ring is not:
(a) 2-phenylindole;
(b) 2-methylbenzimidazole;
(c) 1,2-di-methylimidazole;
(d) 2-phenylimidazole; and
(e) 2,4,5-tri-phenylimidazole.

37. The method of claim 36 wherein the Lewis acid is $TiCl_4$.

* * * * *